United States Patent
Pianigiani et al.

(10) Patent No.: US 11,546,210 B2
(45) Date of Patent: *Jan. 3, 2023

(54) INITIALIZING NETWORK DEVICE AND SERVER CONFIGURATIONS IN A DATA CENTER

(71) Applicant: Juniper Networks, Inc., Sunnyvale, CA (US)

(72) Inventors: Jacopo Pianigiani, Cupertino, CA (US); Thomas Murray, Santa Cruz, CA (US); Michael Henkel, Saratoga, CA (US); Tong Jiang, Fremont, CA (US); Ignatious Johnson Christober, Sunnyvale, CA (US); Atul S Moghe, San Jose, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,608

(22) Filed: Aug. 16, 2021

(65) Prior Publication Data

US 2021/0377113 A1    Dec. 2, 2021

Related U.S. Application Data

(63) Continuation of application No. 16/396,095, filed on Apr. 26, 2019, now Pat. No. 11,095,504.

(51) Int. Cl.
*H04L 41/0806* (2022.01)
*H04L 12/46* (2006.01)
(Continued)

(52) U.S. Cl.
CPC ...... *H04L 41/0806* (2013.01); *H04L 12/4641* (2013.01); *H04L 61/5014* (2022.05); *H04L 67/34* (2013.01); *H04L 67/10* (2013.01)

(58) Field of Classification Search
CPC .. H04L 67/34; H04L 12/4641; H04L 41/0806
See application file for complete search history.

(56) References Cited

U.S. PATENT DOCUMENTS 5,684,800 A * 11/1997 Dobbins ............. H04L 12/1886
                                                                370/469
8,279,869 B1    10/2012 Tran et al.
(Continued)

FOREIGN PATENT DOCUMENTS

EP        3182648 A1     6/2017
WO    2013/184846 A1    12/2013

OTHER PUBLICATIONS

Notice of Allowance from U.S. Appl. No. 16/396,069, dated Oct. 15, 2021, 5 pp.
(Continued)

*Primary Examiner* — Douglas B Blair
(74) *Attorney, Agent, or Firm* — Shumaker & Sieffert, P.A.

(57) ABSTRACT

A system for configuring a data center includes a fabric management server coupled to a management switch. A provisional Software Defined Networking (SDN) controller executing on the fabric management server can discover physical servers coupled to the management switch, receive network interface configuration information from the physical servers, and use the discovered network interface configuration information to determine a configuration for switches and servers coupled to an IP fabric. The configuration can be migrated to a full functionality SDN controller.

20 Claims, 27 Drawing Sheets

(51) Int. Cl.
  *H04L 67/00* (2022.01)
  *H04L 61/5014* (2022.01)
  *H04L 67/10* (2022.01)

(56) References Cited

U.S. PATENT DOCUMENTS

| | | | |
|---|---|---|---|
| 8,396,059 | B1 | 3/2013 | Kreeger et al. |
| 10,291,497 | B2 | 5/2019 | Mehta et al. |
| 10,728,121 | B1 | 7/2020 | Chitalia et al. |
| 10,924,335 | B2* | 2/2021 | Kapur ................. H04L 41/0803 |
| 10,944,665 | B1* | 3/2021 | Singh ...................... H04L 45/70 |
| 11,095,504 | B2 | 8/2021 | Pianigiani et al. |
| 11,258,661 | B2* | 2/2022 | Jiang ..................... H04L 41/122 |
| 2002/0174198 | A1 | 11/2002 | Halter |
| 2009/0270106 | A1 | 10/2009 | Matsunaga |
| 2013/0315096 | A1* | 11/2013 | Shetty ................. H04L 41/0886 370/254 |
| 2014/0115137 | A1 | 4/2014 | Keisam |
| 2014/0280814 | A1* | 9/2014 | Maity ................... H04L 41/022 709/223 |
| 2015/0113145 | A1* | 4/2015 | Walls ...................... H04L 47/70 709/226 |
| 2016/0006641 | A1 | 1/2016 | Wiggs et al. |
| 2016/0014073 | A1* | 1/2016 | Reddy ..................... H04L 43/16 713/2 |
| 2016/0072642 | A1* | 3/2016 | Shih .................... H04L 12/4666 370/392 |
| 2016/0072718 | A1 | 3/2016 | Liu et al. |
| 2016/0373310 | A1* | 12/2016 | Banikazemi ........ H04L 41/0806 |
| 2017/0054603 | A1* | 2/2017 | Kulkarni ............... G06F 9/5077 |
| 2017/0149880 | A1* | 5/2017 | Lochhead ........... H04L 41/0895 |
| 2017/0149931 | A1* | 5/2017 | Lochhead ........... H04L 41/5009 |
| 2018/0145955 | A1* | 5/2018 | Nirwal .................. H04L 9/0894 |
| 2018/0157532 | A1* | 6/2018 | Kumar .................. G06F 9/5061 |
| 2018/0287902 | A1 | 10/2018 | Chitalia et al. |
| 2018/0287905 | A1* | 10/2018 | Mehta ...................... H04L 43/20 |
| 2019/0021037 | A1 | 1/2019 | Shaw et al. |
| 2019/0090154 | A1* | 3/2019 | Olderdissen ...... H04W 28/0273 |
| 2020/0127903 | A1 | 4/2020 | Chintala et al. |
| 2020/0344119 | A1 | 10/2020 | Jiang et al. |
| 2021/0019131 | A1 | 1/2021 | Tulsian et al. |
| 2021/0168028 | A1 | 6/2021 | Kapur et al. |

OTHER PUBLICATIONS

"Topology Mapping For SDN Openflow Networks With Nectus," Retrieved Dec. 16, 2019 from https://www.nectus5.com/topology-mapping-openflow-capable-sdn-networks-nectus/, Jan. 29, 2018, 5 pp.

Advisory Action from U.S. Appl. No. 16/396,069, dated Jan. 27, 2021, 5 pp.

Extended Search Report from counterpart European Application No. 19181759.2, dated Jan. 2, 2020, 11 pp.

Final Office Action from U.S. Appl. No. 16/396,069, dated Nov. 18, 2020, 9 pp.

Garcia, "Introduction to Red Hat OpenStack Platform Director", Red Hat, Retrieved from: https://www.redhat.com/en/blog/introduction-red-hat-openstack-platform-director, Jul. 25, 2016, 14 pp.

Hopps, "Analysis of an Equal-Cost Multi-Path Algorithm," RFC 2992, Network Working Group, Nov. 2000, 8 pp.

Munoz et al., "Integrated SDN/NFV management and orchestration architecture for dynamic deployment of virtual SDN control instances for virtual tenant networks [invited]," Journal of Optical Communications and Networking; 7(11), Nov. 2015, 9 pp.

Office Action from U.S. Appl. No. 16/396,069, dated Apr. 2, 2021, 11 pp.

Office Action from U.S. Appl. No. 16/396,069, dated Jun. 29, 2020, 11 pp.

Response to Advisory Action dated Jan. 27, 2021 from U.S. Appl. No. 16/396,069, filed Feb. 18, 2021, 15 pp.

Response to Extended Search Report dated Jan. 2, 2020 from counterpart European Application No. 19181759.2, filed Apr. 28, 2021, 21 pp.

Response to Final Office Action dated Nov. 18, 2020 from U.S. Appl. No. 16/396,069, filed Jan. 19, 2021, 13 pp.

Response to Office Action dated Apr. 2, 2021 from U.S. Appl. No. 16/396,069, filed Jul. 2, 2021, 13 pp.

Response to Office Action dated Jun. 29, 2020 from U.S. Appl. No. 16/396,069, filed Sep. 29, 2020, 16 pp.

Prosecution History from U.S. Appl. No. 16/396,095, dated Jun. 16, 2020 through Apr. 26, 2021, 94 pp.

Communication pursuant to Article 94(3) EPC from counterpart European Application No. 19181759.2 dated Mar. 11, 2022, 9 pp.

Response to Communication pursuant to Article 94(3) EPC dated Mar. 11, 2022, from counterpart European Application No. 19181759.2 filed Jul. 7, 2022, 17 pp.

\* cited by examiner

| Interface | MAC Address | Switch Port VLAN IDs | Switch Chassis ID | Switch Port ID |
|-----------|-------------------|----------------------|-------------------|----------------|
| eno1      | 0c:c4:7a:6a:f8:9c | []                   | 3c:61:04:a4:0b:2c | 561            |
| eno2      | 0c:c4:7a:6a:f8:9d | []                   | 3c:61:04:a4:0b:2c | 721            |
| ens2f0    | 90:e2:ba:84:53:7a | []                   | 3c:61:04:a4:0b:2c | 656            |
| ens2f1    | 90:e2:ba:84:53:7b | []                   | 3c:61:04:a4:0b:2c | 524            |

Table 1: Port information of introspected server

FIG. 7

```
NETWORKS:
  -
    INTERNALAPI:
      VLAN: 100
      PREFIX: 10.0.0.0
      PREFIX_LENGTH: 24
      GATEWAY: 10.0.0.1
  -
    EXTERNALAPI:
      VLAN: 200
      PREFIX: 10.0.1.0
      PREFIX_LENGTH: 24
      GATEWAY: 10.0.1.1
  -
    PROVISIONING:
      VLAN: 0 #<-- 0 MEANS NO VLAN
      PREFIX: 10.0.2.0
      PREFIX_LENGTH: 24
      GATEWAY: 10.0.2.1
  -
    TENANT:
      VLAN: 400
      PREFIX: 10.0.3.0
      PREFIX_LENGTH: 24
      GATEWAY: 10.0.3.1
---
ROLES:
  COMPUTE:           802
    NICS:
      NIC1 :
        NETWORKS:
          - PROVISIONING
          - INTERNALAPI
          - EXTERNALAPI
          - TENANT
  CONTRAIL_CONTROLLER:
    NICS:
      BOND0:
        MEMBERS:
          - NIC3
          - NIC4
        NETWORKS:
          - TENANT
      NIC1:
        NETWORKS:
          - PROVISIONING
          - INTERNALAPI
          - EXTERNALAPI
```

FIG. 8

```
openstack baremetal introspection data save 242e6298-28e7-4180-b22b-fb10ce9d9d12 | jq .all_interfaces.eno1
{
    "pxe": true,
    "client_id": null,
    "lldp_processed": {
        "switch_port_mtu": 9216,
        "switch_port_autonegotiation_enabled": true,
        "switch_port_autonegotiation_support": true,
        "switch_capabilities_support": [
            "Bridge",
            "Router"
        ],
        "switch_mgmt_addresses": [
            "10.84.159.116"
        ],
        "switch_port_id": "561",
        "switch_port_physical_capabilities": [
            "1000BASE-T fdx"
        ],
        "switch_port_description": "ge-0/0/14",
        "switch_capabilities_enabled": [
            "Bridge",
            "Router"
        ],
        "switch_port_mau_type": "Unknown",
        "switch_port_link_aggregation_id": 0,
        "switch_system_name": "5b3-qfx1",
        "switch_port_link_aggregation_enabled": false,
        "switch_port_link_aggregation_support": true,
        "switch_system_description": "Juniper Networks, Inc. qfx3500s Ethernet Switch, kernel JUNOS
14.1X53-D10.4, Build date: 2014-10-17 00:23:05 UTC Copyright (c) 1996-2014 Juniper Networks, Inc.",
        "switch_port_vlans": [],
        "switch_chassis_id": "3c:61:04:a4:0b:2c",
        "switch_port_untagged_vlan_id": 700
    },
    "mac": "0c:c4:7a:6a:f8:9c",
    "ip": "192.168.24.101"
} openstack baremetal introspection data save 242e6298-28e7-4180-b22b-fb10ce9d9d12 | jq
.all_interfaces.eno1.lldp_processed.switch_system_name
"5b3-qfx1"
openstack baremetal introspection data save 242e6298-28e7-4180-b22b-fb10ce9d9d12 | jq
.all_interfaces.eno1.lldp_processed.switch_port_description
"ge-0/0/14"
```

FIG. 9

INITIALIZING NETWORK DEVICE AND SERVER CONFIGURATIONS IN A DATA CENTER

RELATED APPLICATIONS

This application is a continuation of, and claims the priority benefit of, U.S. patent application Ser. No. 16/396,095 entitled "INITIALIZING NETWORK DEVICE AND SERVER CONFIGURATIONS IN A DATA CENTER," filed Apr. 26, 2019, the entire contents of which is hereby incorporated by reference.

TECHNICAL FIELD

The disclosure relates to computer networks and, more particularly, to configuring network devices and servers.

BACKGROUND

In a typical cloud data center environment, a large collection of interconnected servers provide computing (e.g., compute nodes) and/or storage capacity to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers. The SDN controller provides management, control, and analytics functions of a virtualized network and orchestrates the virtual routers by communicating with the virtual routers.

A typical data center can include hundreds of physical network switches and thousands of storage and application servers. The correct and efficient operation of these switches and servers to support SDN platforms can depend on the proper configuration and provisioning of the switches and servers.

SUMMARY

In general, the disclosure describes techniques for initializing configurations for physical switches and servers in a data center. Each of the switches and servers can be coupled to a management switch. Additionally, the switches and servers can be coupled to one or more Internet Protocol (IP) fabric switches. The switches and servers can be configured to provide a data plane for network communication via the IP fabric switches. The management switch can be used to communicate network management related information and is not intended for normal data communication between network devices. Thus, the IP fabric switches form what can be referred to as an "in-band" communication network and the management switch can form what is referred to as an "out-of-band" communication network.

In some aspects, a fabric management server includes a provisional (e.g., lightweight) version of an SDN controller and a configuration wizard. A technique for initializing a configuration of the physical switches and servers in a data center can include various discovery and configuration workflows (e.g., processes) that may be invoked and coordinated by the configuration wizard. Data discovered by a first workflow may be used in subsequent workflows to initialize the configuration of the network devices in the data center. Thus, the techniques provide an automated mechanism for "bootstrapping" the configuration of a data center.

During a first discovery process, the provisional SDN controller can discover, via the management switch, the presence of physical switches that form the IP fabric. Configuration data for the discovered physical switches can be provided to the physical servers by the fabric management server via the management switch.

During a second discovery process, the fabric management server discovers the physical servers that are communicably coupled to the management switch. For each physical server that is discovered, the provisional SDN controller can further discover configuration information about the physical server. Such information can include the network interfaces available on the physical server, MAC addresses for the network interfaces, and switch ports on the physical server. The server configuration information can be used along with the previously discovered switch configuration information to determine an IP fabric configuration. Information from the IP fabric configuration can be used to determine configurations for the switches and servers in the data center.

After the second discovery process has been completed and the discovered physical servers have been configured, one or more of the discovered servers can be selected and a standard (i.e., full functionality) SDN controller can be installed and configured on the selected server(s). The standard SDN controller can be used to provide functionality not available in the lightweight SDN controller, such as cluster definitions, high availability services, etc.

The techniques of this disclosure may provide one or more advantages. For example, the techniques may enable accurate and rapid configuration of the physical switches and servers in a data center. The techniques can significantly reduce the need for time consuming and error-prone manual configuration of potentially thousands of network devices in a data center, thereby allowing for scalable configuration of large data centers having many network devices.

In one example aspect, a method includes receiving, by a first Software Defined Networking (SDN) controller configured on a fabric management server communicably coupled to a management switch, switch configuration information for one or more Internet Protocol (IP) fabric switches communicably coupled to the management switch; discovering, by the first SDN controller, a physical server communicably coupled to the management switch; receiving, by the first SDN controller from the physical server via the management switch, server configuration information associated with one or more network interfaces coupling the physical server to an IP fabric switch of the one or more IP fabric switches; determining, by the first SDN controller, based at least in part on the server configuration information and the switch configuration information, an IP fabric configuration; providing, by the first SDN controller, switch port configuration information to the one or more IP fabric switches, wherein the switch port configuration information is based, at least in part, on the IP fabric configuration; and providing, by the first SDN controller, server network interface configuration information to the physical server, wherein the server network interface configuration information is based, at least in part, on the IP fabric configuration.

In another example aspect, a system includes a fabric management server having a first management port; a physical server having a second management port; a management switch communicably coupled to the first and second management ports; and one or more Internet Protocol (IP) fabric switches communicably coupled to the physical server; wherein the fabric management server comprises a first Software Defined Networking (SDN) controller configured to: receive switch configuration information for the one or more IP fabric switches communicably via the management switch, discover a physical server communicably coupled to the management switch, receive, from the physical server via the management switch, server configuration information associated with one or more network interfaces coupling the physical server to an IP fabric switch of the one or more IP fabric switches, determine, based at least in part on the server configuration information and the switch configuration information, an IP fabric configuration, provide switch port configuration information to the one or more switches, wherein the switch port configuration information is based, at least in part, on the IP fabric configuration, and provide server network interface configuration information to the physical server, wherein the server network interface configuration information is based, at least in part, on the IP fabric configuration.

In a further example aspect, a computer-readable medium includes instructions for causing a programmable processor executing a first SDN controller to receive switch configuration information for one or more Internet Protocol (IP) fabric switches communicably via the management switch; discover a physical server communicably coupled to the management switch; receive, from the physical server via the management switch, server configuration information associated with one or more network interfaces coupling the physical server to an IP fabric switch of the one or more IP fabric switches; determine, based at least in part on the server configuration information and the switch configuration information, an IP fabric configuration; provide switch port configuration information to the one or more IP fabric switches, wherein the switch port configuration information is based, at least in part, on the IP fabric configuration; and provide server network interface configuration information to the physical server, wherein the server network interface configuration information is based, at least in part, on the IP fabric configuration.

The details of one or more examples are set forth in the accompanying drawings and the description below. Other features, objects, and advantages will be apparent from the description and drawings, and from the claims.

BRIEF DESCRIPTION OF DRAWINGS

FIG. 7 illustrates an example server network interface configuration.

FIG. 8 illustrates example mapping data mapping between server roles, network interfaces, switch ports, and networks.

FIG. 9 illustrates an example fabric port configuration.

DETAILED DESCRIPTION

One way to configure and provision new switches and new servers in a data center is to download the configuration and software via the physical network to the new servers and switches. However, a "chicken or egg" problem exists in that the new servers and switches are not configured to communicate over the physical network and therefore cannot download configurations and software. Thus, in some data center systems, configuration and provisioning may be a manual process. Manual configuration can be time consuming and error prone. As a result, manual configuration may be impractical in a data center having hundreds of switches and thousands of servers requiring configuration.

The example techniques described below are provided in the context of configuring switches and servers in a data center. The techniques can also be applied in other computer network environments besides data centers where there are numerous switches and servers that require configuration.

Figure 1:
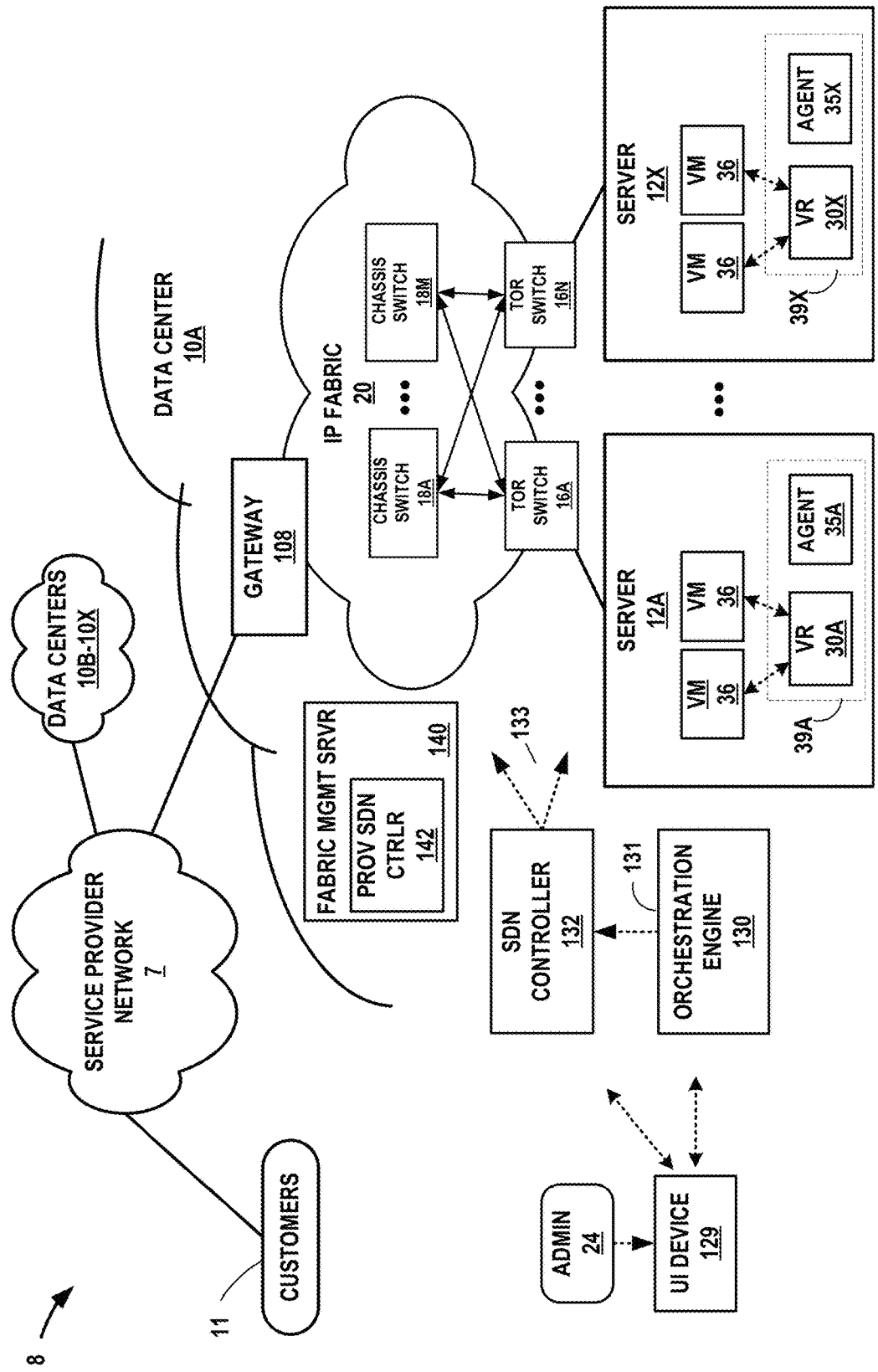
FIG. 1 is a block diagram illustrating an example computer network system in accordance with techniques described herein.

FIG. 1 is a block diagram illustrating an example computer network system 8 in accordance with techniques described herein. The example computer network system 8 can be configured using the techniques described below with respect to FIGS. 2, 3A-3D, 4A-4D, 5 and 6.

Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. In some aspects, the SDN controller 132 may be part of a high availability (HA) cluster and provide HA cluster configuration services. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39) that performs data forwarding and traffic statistics collection functions for workloads executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Data center 10A can have thousands of chassis switches 18 and TOR switches 16, and hundreds of servers 12. The example illustrated in FIG. 1 represents a fully configured data center 10A. When the data center is first being set up, these network devices require configuration. In some aspects, a fabric management server 140 includes a provisional SDN controller 142 that can be used during the initial configuration process as described in more detail below. The provisional SDN controller 142 can perform the configuration functions of SDN controller 132, but may lack other functionality provided by SDN controller 132 such as high availability and cluster capabilities. The provisional SDN controller 142 can discover network devices and determine appropriate configuration for the network devices based on the available connections and roles. After the provisional SDN controller 142 has determined the initial configuration of the data center 10A, the provisional SDN controller can instantiate the SDN controller 132 and migrate the configuration to the SDN controller 132, which can take over for the provisional SDN controller 142. The provisional SDN controller can then be removed from the system. A practical application of the techniques described in further detail below is that an initial configuration for a data center 10A can be established with little or no manual configuration required on the part of an administrator. The reduction of manual configuration effort is an advantage that some examples can provide over previous configuration methodology, and may avoid errors and increase network scalability.

Figure 2:
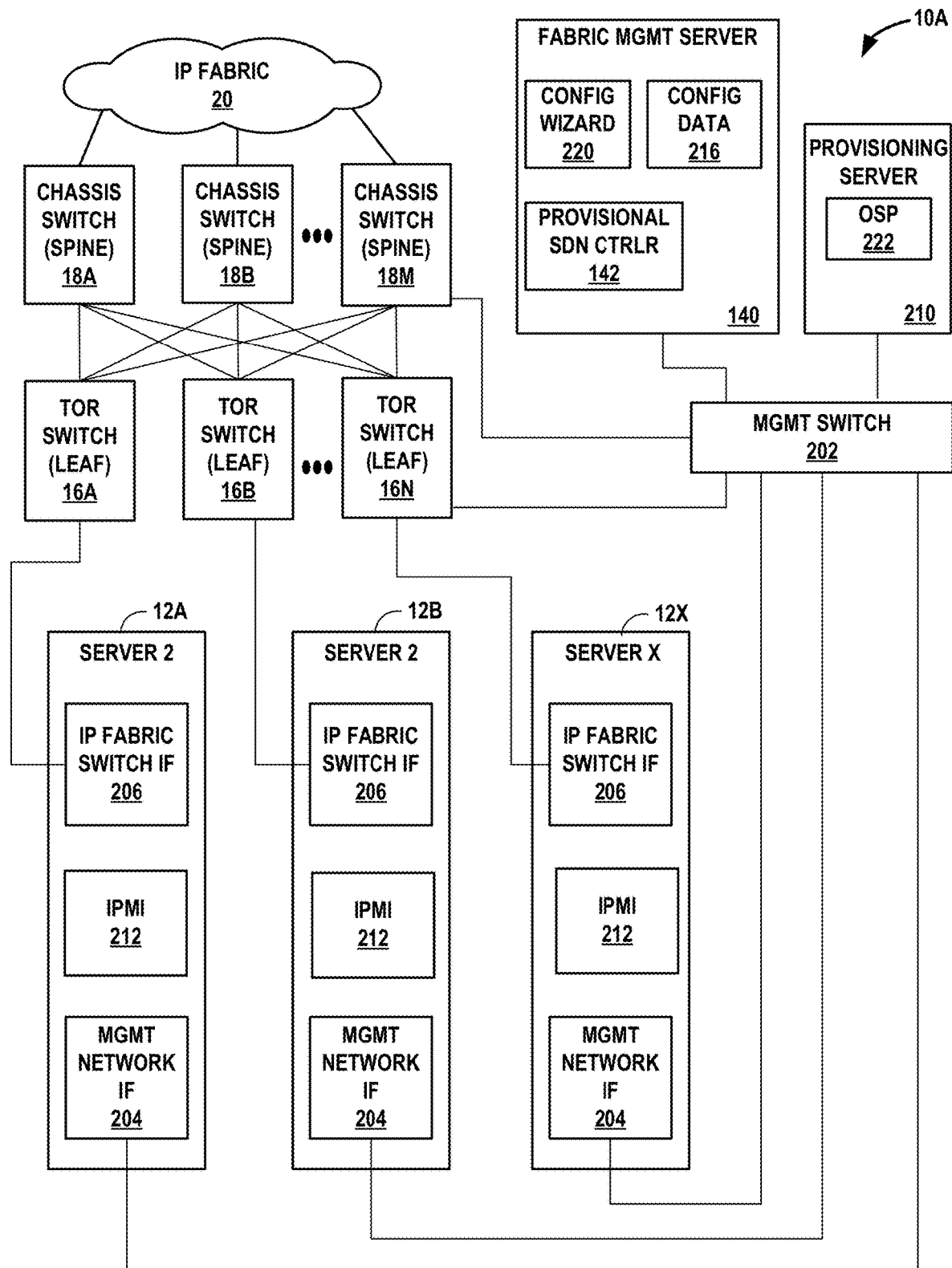
FIG. 2 is a block diagram illustrating an example implementation of a data center in the example computer network system of FIG. 1 in further detail.

FIG. 2 is a block diagram illustrating an example implementation of a data center in the example computer network system of FIG. 1 in further detail. In the example of FIG. 2, data center 10A includes a fabric management server 140 and a provisioning server 210 communicably coupled to a management switch 202. Servers 12, chassis switches 18 and TOR switches 16 are also communicably coupled to the management switch 202. The management switch and the server connections and switch connections to the management switch form an out-of-band management network.

Each of the servers 12 can include a management network interface 204, an IP fabric switch interface 206, and an Intelligent Platform Management Interface (IPMI) 212. Management network interface 204 provides a hardware and/or software interface that provides for communicating data between a server 12A-12X to the management switch 202. IP fabric switch interface 206 provides a hardware and/or software interface that provides for communicating data between a server 12A-12X to a TOR switch 16A-16N.

IPMI 212 provides an interface to a computing system (e.g., any of servers 12) that can be used to monitor and manage the operation of the computing system that is independent of the computing system's host processor(s) and operating system. For example, IPMI 212 can enable a system administrator to manage a computing system that is powered off, has not been completely configured or lacks the ability to function or communicate as intended.

Fabric management server 140 can include a configuration wizard 220 and a provisional SDN controller 142. Configuration wizard 220 can provide a user interface to initiate and control the execution of various configuration related workflows. Additionally, configuration wizard 220 can receive input from a user that provides data that can be used in the workflows to configure network devices in data center 10A. Data collected, produced, and used by the configuration wizard 220 and provisional SDN controller 142 can be maintained in configuration data 216.

In some aspects, provisional SDN controller 142 can perform a subset of the functions of SDN controller 132 (FIG. 1). In other words, provisional SDN controller 142 can be a "lightweight" version of a standard (i.e., full functionality) SDN controller such as SDN controller 132. For example, provisional SDN controller 142 can perform discovery operations to learn the configuration of a network (e.g., IP fabric 20) and the devices coupled to the network. However, provisional SDN controller 142 may lack some of the functionality of SDN controller 132 such as configuring cluster definitions, high availability services, etc.

In some aspects, the functionality provided by provisional SDN controller 142 can be split among different entities. For example, provisional SDN controller 142 can perform operations for discovering and configuring switches such as TOR switches 16 and chassis switches 18 in data center 10A. A separate server discovery program or application can perform operations for discovering and configuring servers in data center 10A.

Provisioning server 210 can store system images, containers, installation packages etc. that can be provided to servers 12 and TOR switches 16 via the management switch 202. For example, provisioning server 210 can store operating system images and applications that can be downloaded to server 12A in response to the provisional SDN controller 142 discovering server 12 and configuring network parameters for server 12A. In the example illustrated in FIG. 2, an Open Stack Platform (OSP) 222 has been installed on provisioning server 210

FIGS. 3A-3D are block diagrams illustrating example network configuration states in accordance with techniques described herein. The network configuration states can be the result of discovery and configuration operations performed by workflows executed by provisional SDN controller 142.

Figure 3A:
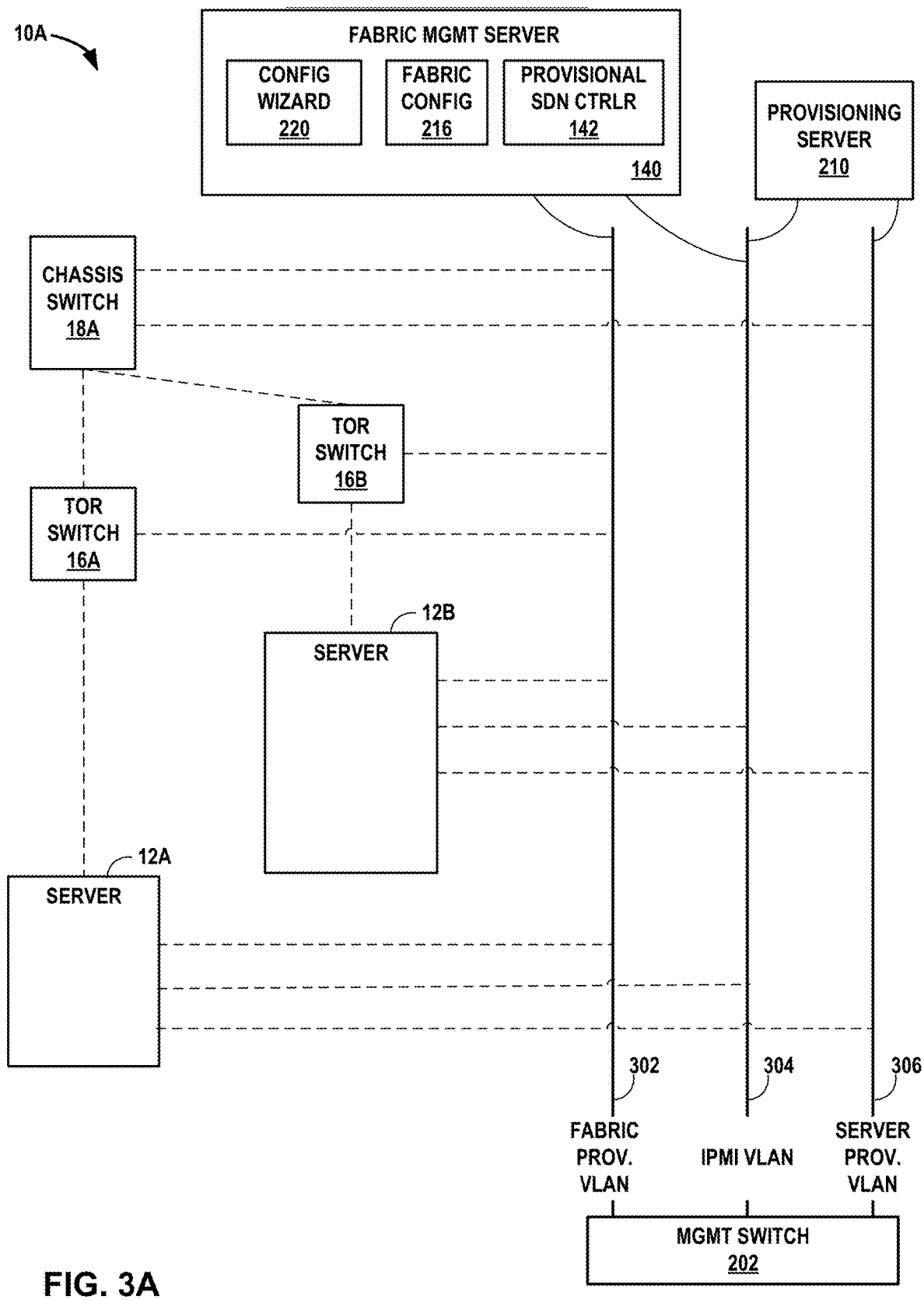
FIGS. 3A-3D are block diagrams illustrating network configuration states in accordance with techniques described herein.

FIG. 3A illustrates an example initial network configuration state of the network devices (e.g., TOR switches 16, chassis switches 18, and servers 12) in a data center 10A. The example initial state can be, for example, an initial state of a new data center that has yet to be configured. Alternatively, the initial state can be an initial state of a data center that is being totally reconfigured. In the example illustrated in FIG. 3A, the fabric management server 308 and provisioning server 210 are communicably coupled to the management switch and are sufficiently configured to communicate network data via management switch 202 as indicated by the solid line connecting fabric management server 140 and provisioning server 210 to the management switch 202. Servers 12, TOR switches 16 and chassis switches 18 are coupled to the management switch 202. However, in the initial network configuration state illustrated in FIG. 3A, they are not currently configured properly to communicate via management switch 202, as indicated by the dashed lines connecting Servers 12, TOR switches 16 and chassis switches 18 to the management switch 202. In some aspects, a fabric provisioning Virtual Local Area Network (VLAN) 302, an IPMI VLAN 304, and a server provisioning VLAN 306 have been configured for management switch 202.

Figure 3B:
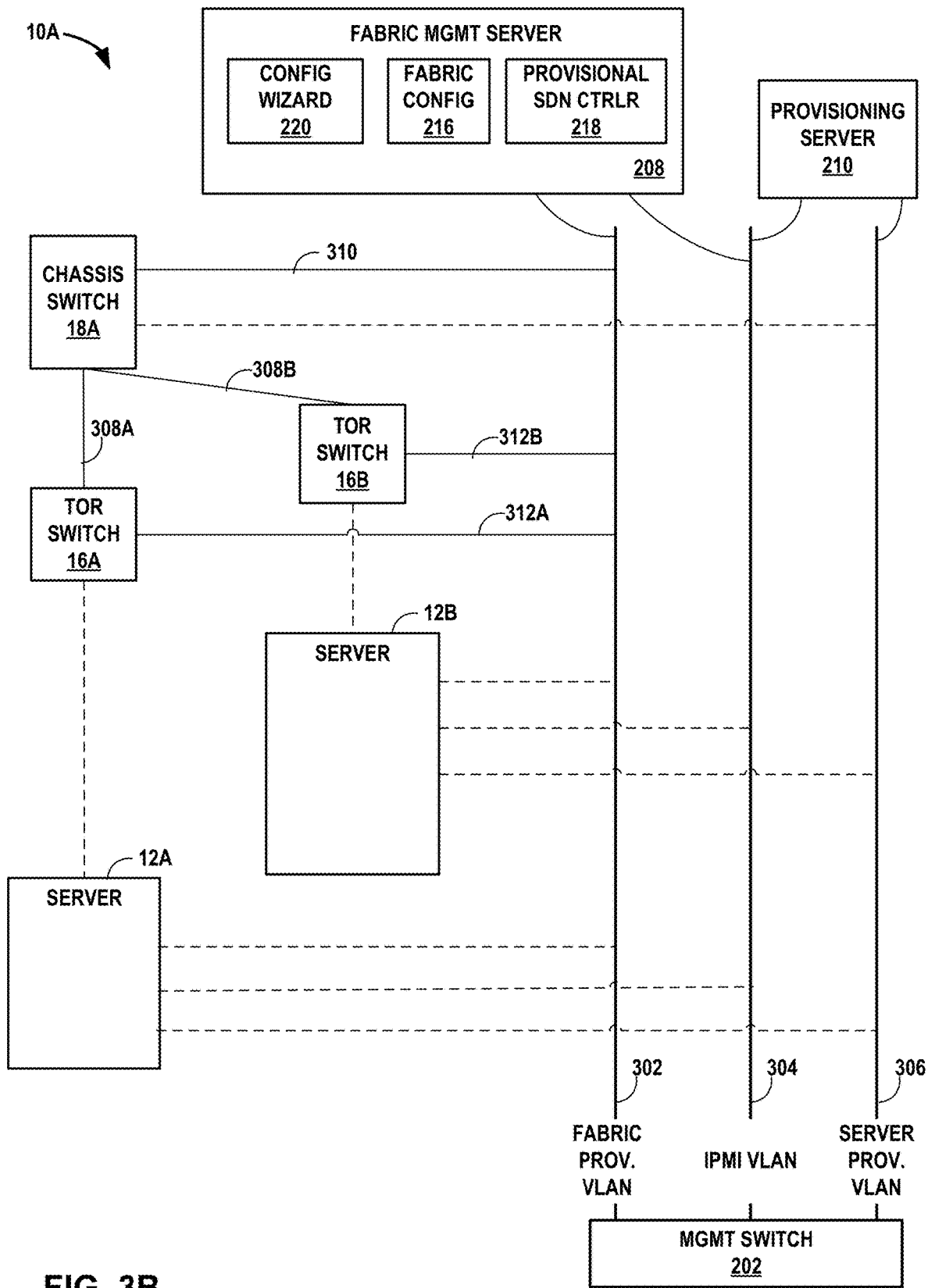

FIG. 3B illustrates an example network configuration state of the network devices in data center 10A after a fabric discovery workflow has been executed. In some aspects, the fabric discovery workflow can cause the provisional SDN controller 142 to discover the chassis switches 18 and TOR switches 16 that are communicably coupled to management switch 202. The provisional SDN controller 142 can store data regarding the discovered switches in fabric configuration 216. Further, the provisional SDN controller 142 can configure the discovered chassis switches 18 and TOR switches 16 to communicate via management switch 202 as indicated by the solid line 310 connecting chassis switch 18A to management switch 202, and solid lines 312A and 312B connecting TOR switches 16A and 16B respectively to management switch 202. Additionally, the data discovered by provisional SDN controller 142 can indicate connectivity between TOR switches 16 and chassis switches 18. In the example illustrated in FIG. 3B, provisional SDN controller 142 has discovered that TOR switches 16A and 16B are communicably coupled to chassis switch 18A. In response to discovering the switches, the provisional SDN controller 142 can configure the TOR switches 16 to communicate with the chassis switches 18 as indicated by the solid lines 308A and 308B.

Figure 3C:
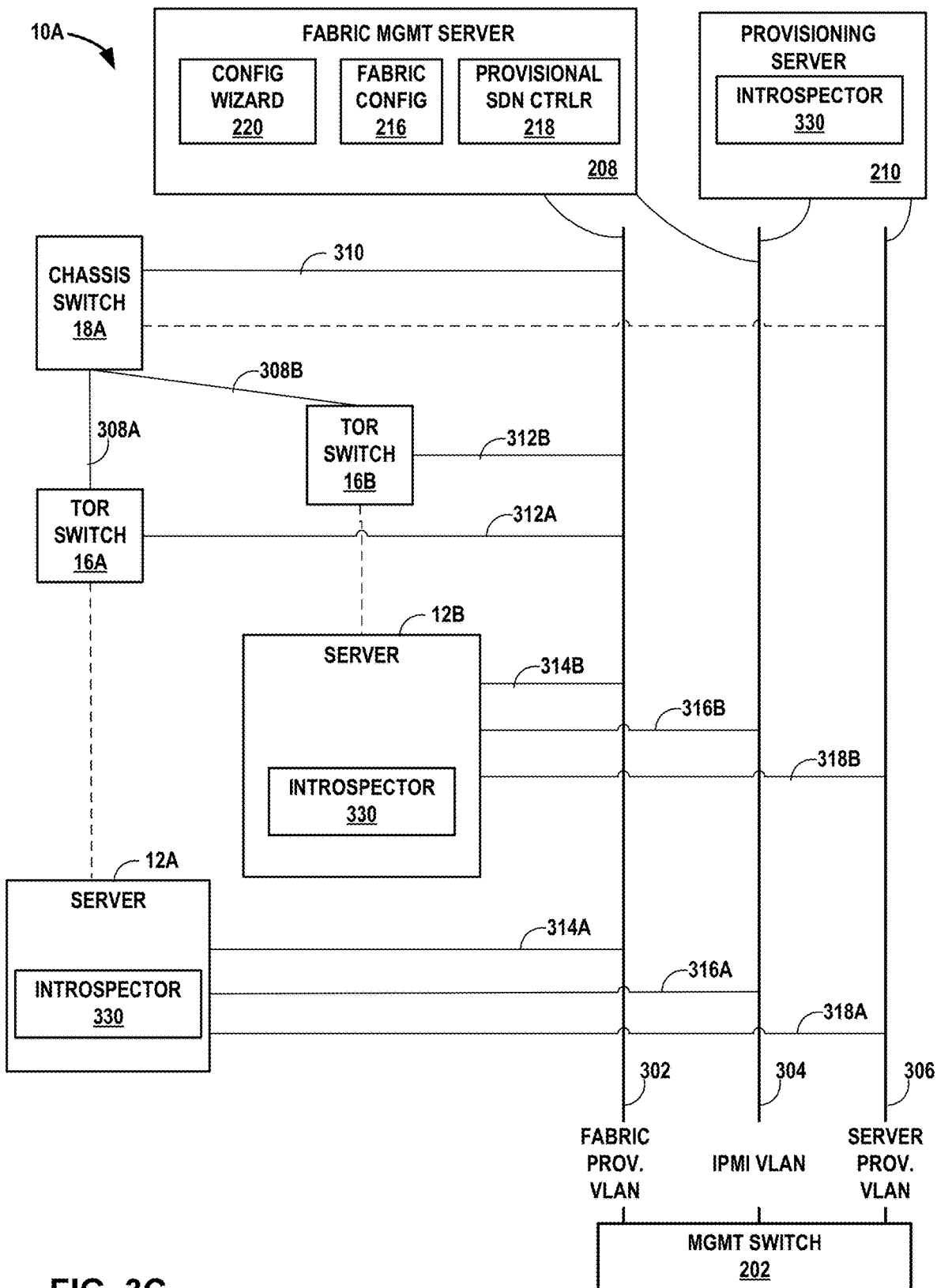

FIG. 3C illustrates an example network configuration state of the network devices in data center 10A after a server discovery workflow has been executed. In some aspects, the server discovery workflow can cause the provisional SDN controller 142 to discover the servers 12 that are communicably coupled to management switch 202. For example, the provisional SDN controller 142 can discover the physical links between the servers 12 and fabric management switch 202. The provisional SDN controller 142 can store data regarding the discovered servers 12 in fabric configuration data 216. Further, the provisional SDN controller 142 can configure the discovered servers 12 to communicate via management switch 202 as indicated by the solid lines 314A and 314B connecting servers 12A and 12B to the fabric provisioning VLAN 302, solid lines 316A and 316B connecting servers 12A and 12B to the IPMI VLAN 304, and solid lines 318A and 318B connecting servers 12A and 12B to the server provisioning VLAN 306.

In some aspects, an introspector 330 can be used to provide configuration data from the servers 12. The introspector 330 can be a software module such as an application, plug-in, daemon, process, thread etc. that, when executed by a server, gathers configuration data for the server. The introspector 330 can then provide the configuration data to the provisional SDN controller 142. In some aspects, the introspector 330 (or an installation package for the introspector 330) can be stored by provisioning server 210. When a server is discovered, the provisional SDN controller 142 can cause the discovered server to download the introspector 330 from provisioning server 210 via the provisioning VLAN and to execute the introspector 330.

Figure 3D:
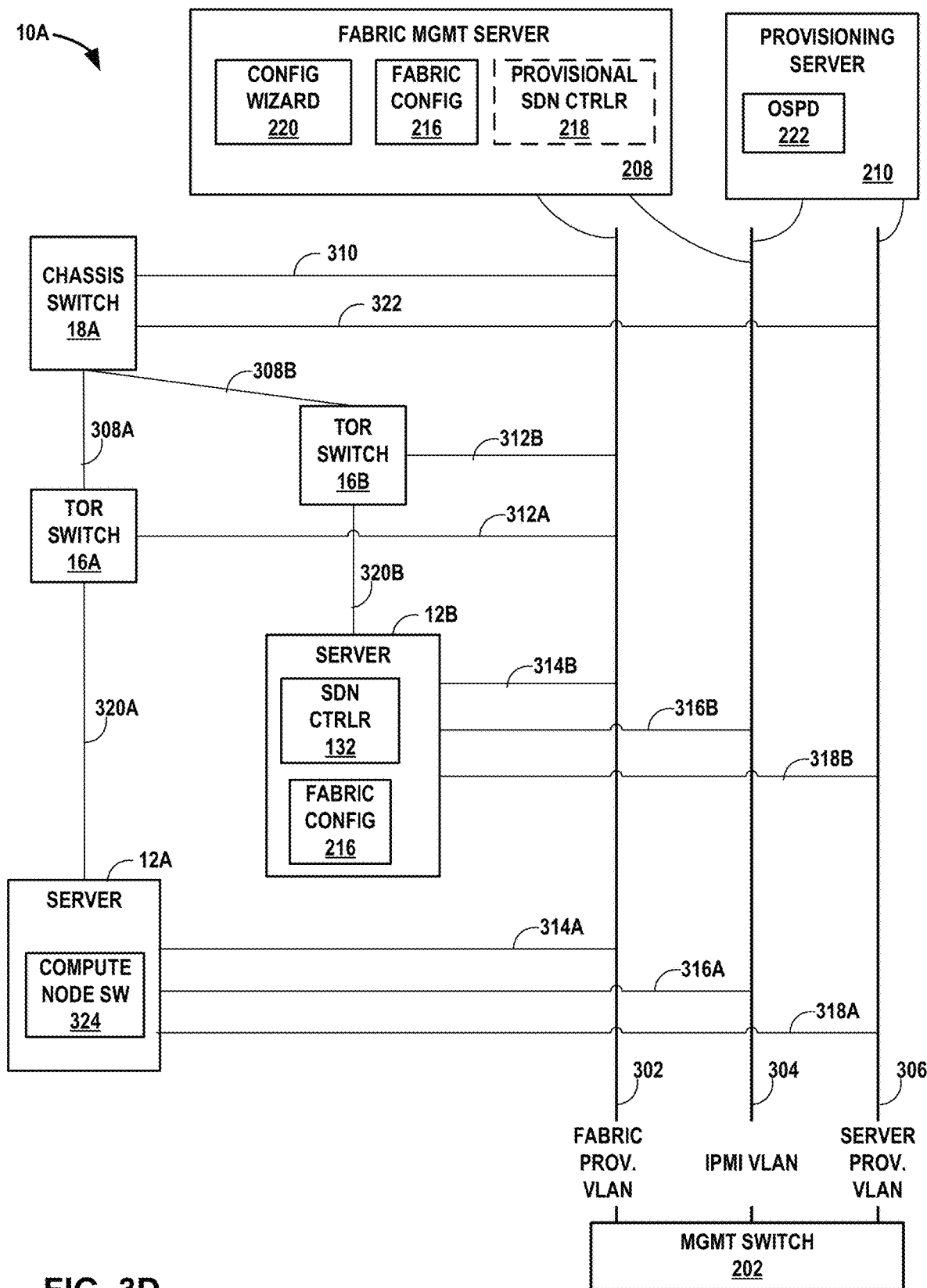

FIG. 3D illustrates an example final network configuration state of the network devices in data center 10A after one or more workflows have been executed to utilize the data gathered by the fabric discovery workflow and server discovery workflow to automatically configure and provision servers 12 to communicate with TOR switches 16. In some aspects, the servers 12 can be configured according to roles assigned to the individual servers. In the example illustrated in FIG. 3D, server 12A has been assigned a compute node role, and server 12B has been assigned a controller node role. Provisional SDN controller 142 can use the discovered fabric configuration data 216 to configure the servers to communicate via the physical links connecting server 12A with TOR switch 16A and server 12B with TOR switch 16B as indicated by solid lines 320A and 320B. Additionally, provisional SDN controller 142 can configure the chassis switch 18A to communicate using server provisioning VLAN 306 as indicated by solid line 322. After the provisional SDN controller has performed the above-described configuration operations, the provisional SDN controller can instantiate SDN controller 132. In some aspects, SDN controller 132 can take over the configuration functions from provisional SDN controller 142. Further, SDN controller 132 can provide capabilities that may not be available in provisional SDN controller 142. For example, SDN controller 132 may provide high availability services and/or cluster services for the data center 10A.

FIGS. 4A-4D are block diagrams illustrating example network configuration data structures in accordance with techniques described herein. The example network configuration data structures can be stored in a data store such as fabric configuration data 216. The example network configuration data structures presented in FIGS. 4A-4D can correspond with data that is added after execution of the workflows described above with respect to FIGS. 3A-3D. In the examples presented in FIGS. 4A-4D, data that is newly added to the fabric configuration data 216 is shaded.

Figure 4A:
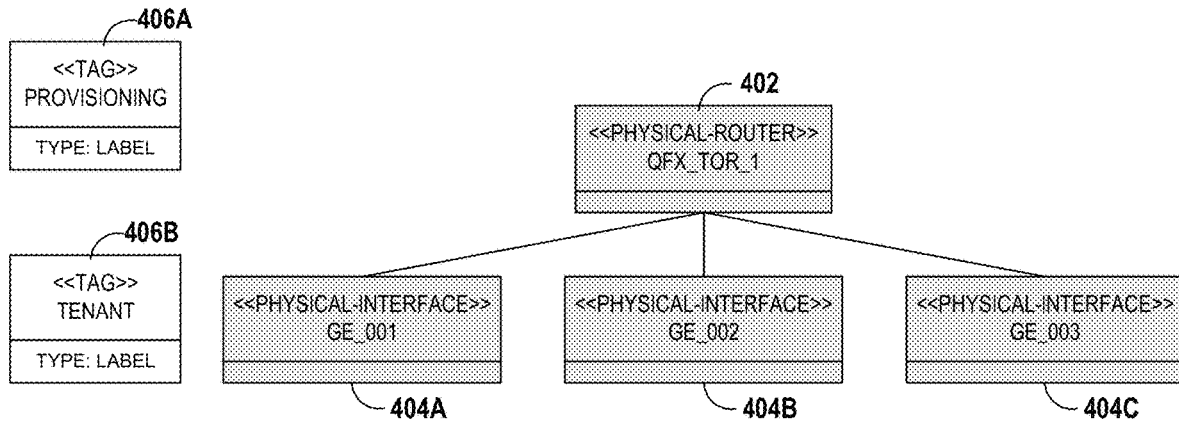
FIGS. 4A-4D are block diagrams illustrating network configuration data in accordance with techniques described herein.

FIG. 4A is a block diagram illustrating example network configuration data structures that can be added as a result of the execution of the fabric discovery workflow discussed with reference to FIG. 3B. Tags 406A and 406B can include data the describes a type of network. In the example illustrated in FIG. 4A, tags can be used to describe a "Provisioning" network type and a "Tenant" network type. After the fabric discovery workflow has been executed, configuration data regarding switches is learned by the provisional SDN controller 142. In the example illustrated in FIG. 4A, a physical router data structure 402 can include data regarding a particular switch identified as "QFX_TOR_1." For example, QFX_TOR_1 may be an identifying label assigned to TOR switch 12A (FIG. 2). In addition, in the example illustrated in FIG. 4A, provisional SDN controller 142 has discovered three ports on the switch QFX_TOR_1 and in response creates physical interface data structures 404A, 404B and 404C to represent the physical ports GE_001, GE_002 and GE_003 on switch QFX_TOR_1. Data structures for logical interfaces (not shown) that may be associated with the physical interface data structures may also be created by the provisional SDN controller 142.

Figure 4B:
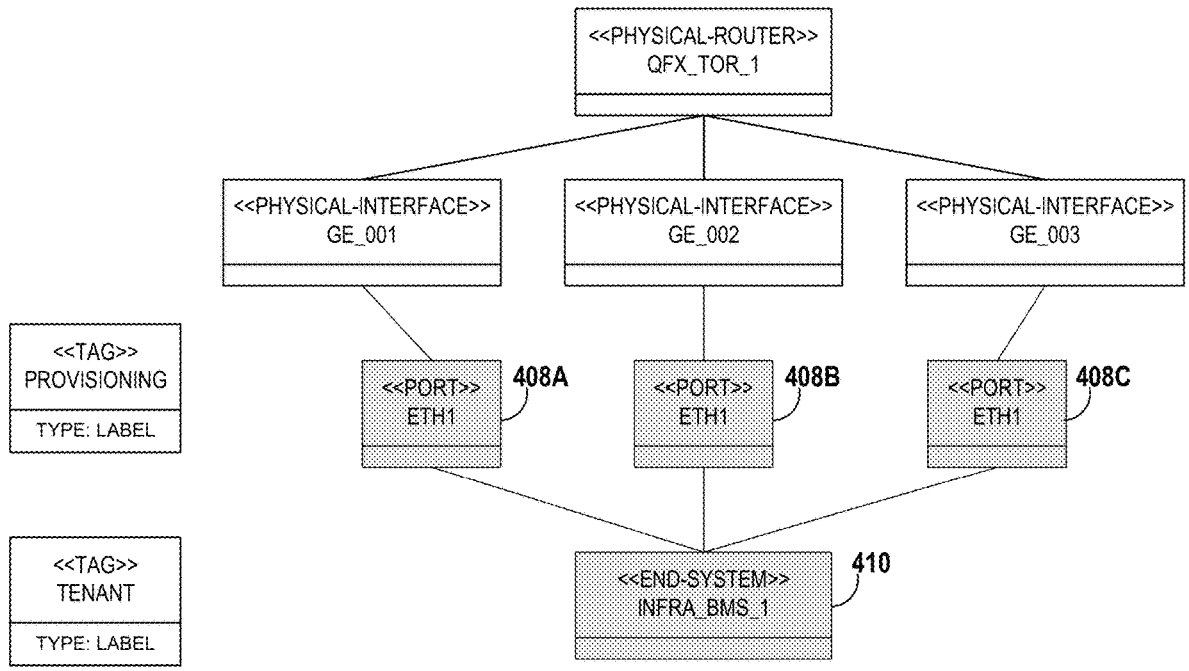

FIG. 4B is a block diagram illustrating example network configuration data structures that can be added as a result of the execution of the server discovery workflow discussed with reference to FIG. 3C. The example data structures of FIG. 4B will be described with reference to a single discovered server (e.g., server 12A). Similar data structures could be added for other servers 12. In the example illustrated in FIG. 4B, provisional SDN controller 142 has discovered server 12A and created end-system data structure 410 to describe the server 12A. In this example, server 12A has been given the identifier of "INFRA_BMS_1." The provisional SDN controller has discovered that server 12A has three ports, and in response, can create three port data structures 408A, 408B and 408C to hold data describing the ports. In addition, provisional SDN controller has discovered that three ports are physically linked to three corresponding switch ports and creates references from each of the port data structures 408A-408C describing the three server 12A ports to the corresponding physical interface data structures 404A-404C describing the switch physical interfaces.

Figure 4C:
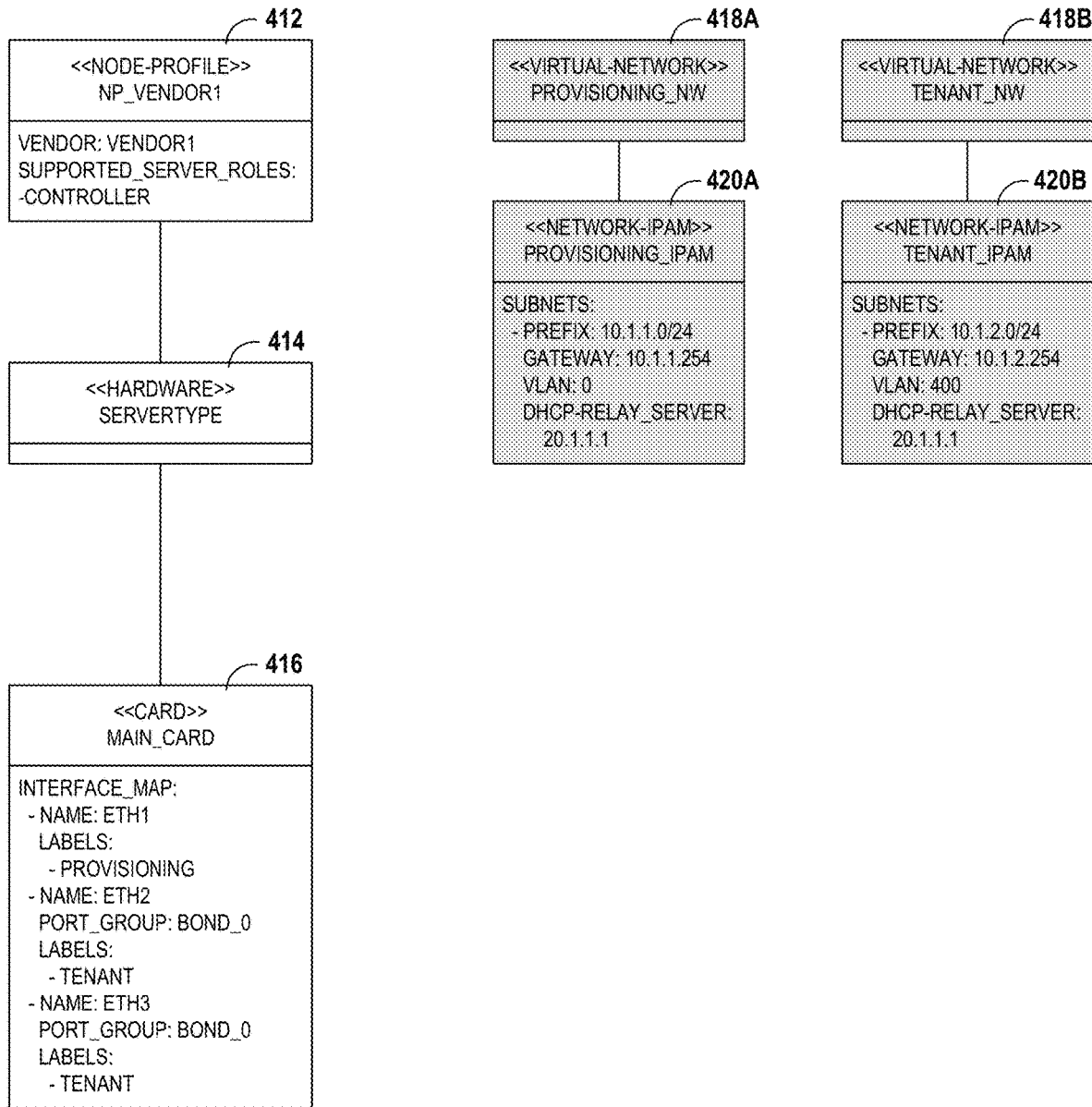
Figure 4D:
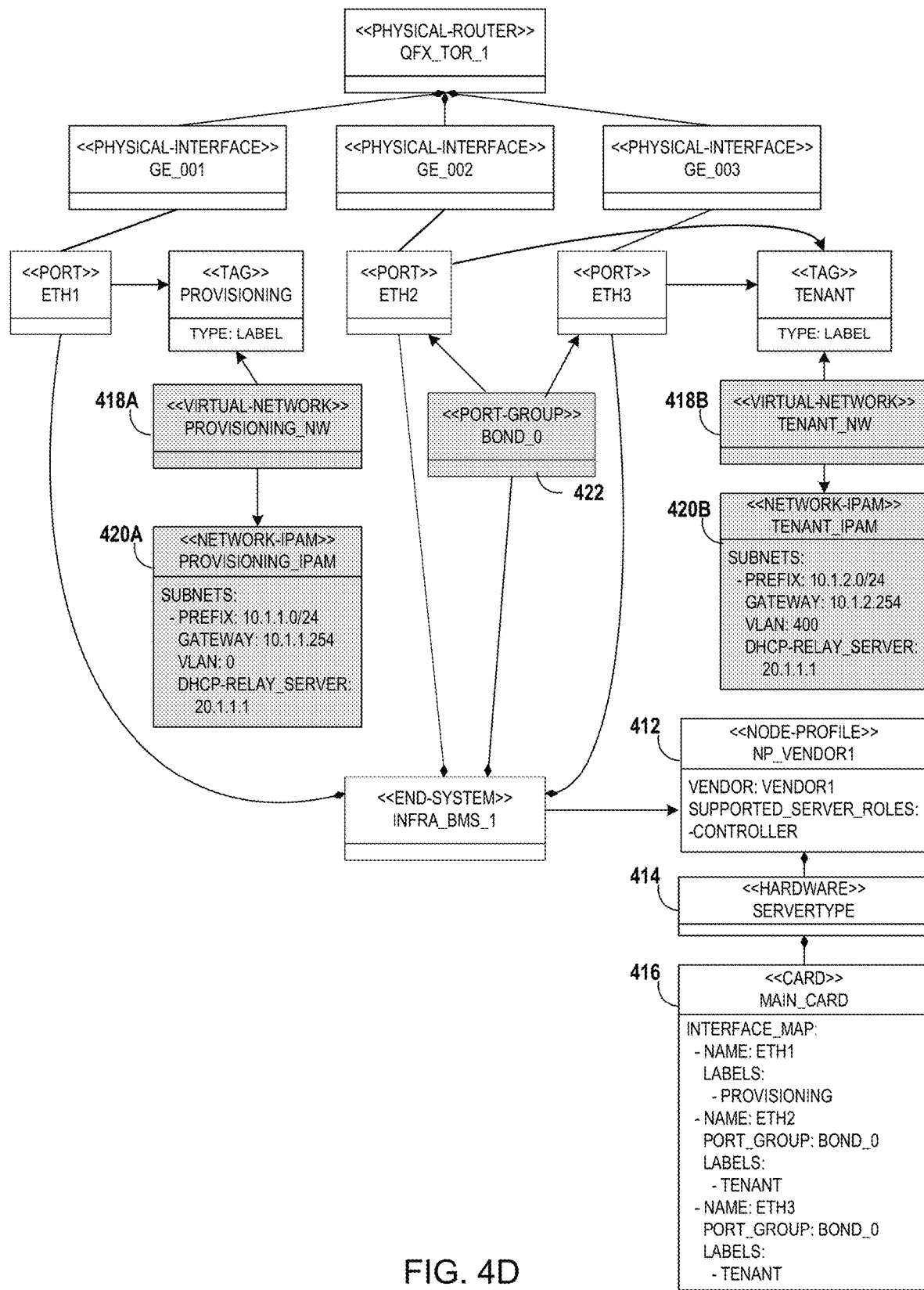

FIGS. 4C and 4D are block diagrams illustrating example network configuration data structures that can be added as a result of the execution of the one or more workflows discussed with reference to FIG. 3D. FIG. 4C illustrates example node profile data structures 412-416 and example infrastructure network data structures 418-420. The node profile data structures can describe the particular hardware associated with a server. In the example illustrated in FIG. 4C, a node-profile data structure 412 includes data identifying the manufacturer of the server (e.g., "vendor1") and the roles that can be supported by the server. A hardware data structure 414 can describe the particular type of server (e.g., "servertype"). For example, the type of server may identify a brand name or other label that identifies the type of server. A card data structure 416 can include data describing the network interface(s) available on the identified server.

A virtual_network data structure 418A and 418B can include data describing virtual networks that are configured for the data center 10A. In the example illustrated in FIGS. 4C and 4D, the virtual_network data structure 418A identifies a virtual network labeled "PROVISIONING_NW" and virtual_network data structure 418B identifies a virtual network labeled "TENANT_NW." In addition, IP Address Management (IPAM) data can be stored for the virtual networks. In the example illustrated in FIGS. 4C and 4D, a network_IPAM data structure 420A stores IPAM data associated with the provisioning virtual network and network_IPAM data structure 420B stores IPAM data associated with the tenant virtual network. The IPAM data can include IP addresses for gateways and Dynamic Host Configuration Protocol (DHCP) relays for the network, and can include VLAN configuration data.

FIG. 4D illustrates the above-described configuration data structures after the provisional SDN controller 142 has linked the data structures to reflect the physical and virtual network configuration of the devices in network data center 10A. In addition to linking the data structures, the provisional SDN controller 142 can identify port groups from data stored in the data structures. In the example illustrated in FIG. 4D, the provisional SDN controller 142 has discovered via the node profile data that ports ETH2 and ETH3 are part of a port group labeled "BOND_0", and in response, has created a port_group data structure 422 to indicate the port grouping.

Figure 5:
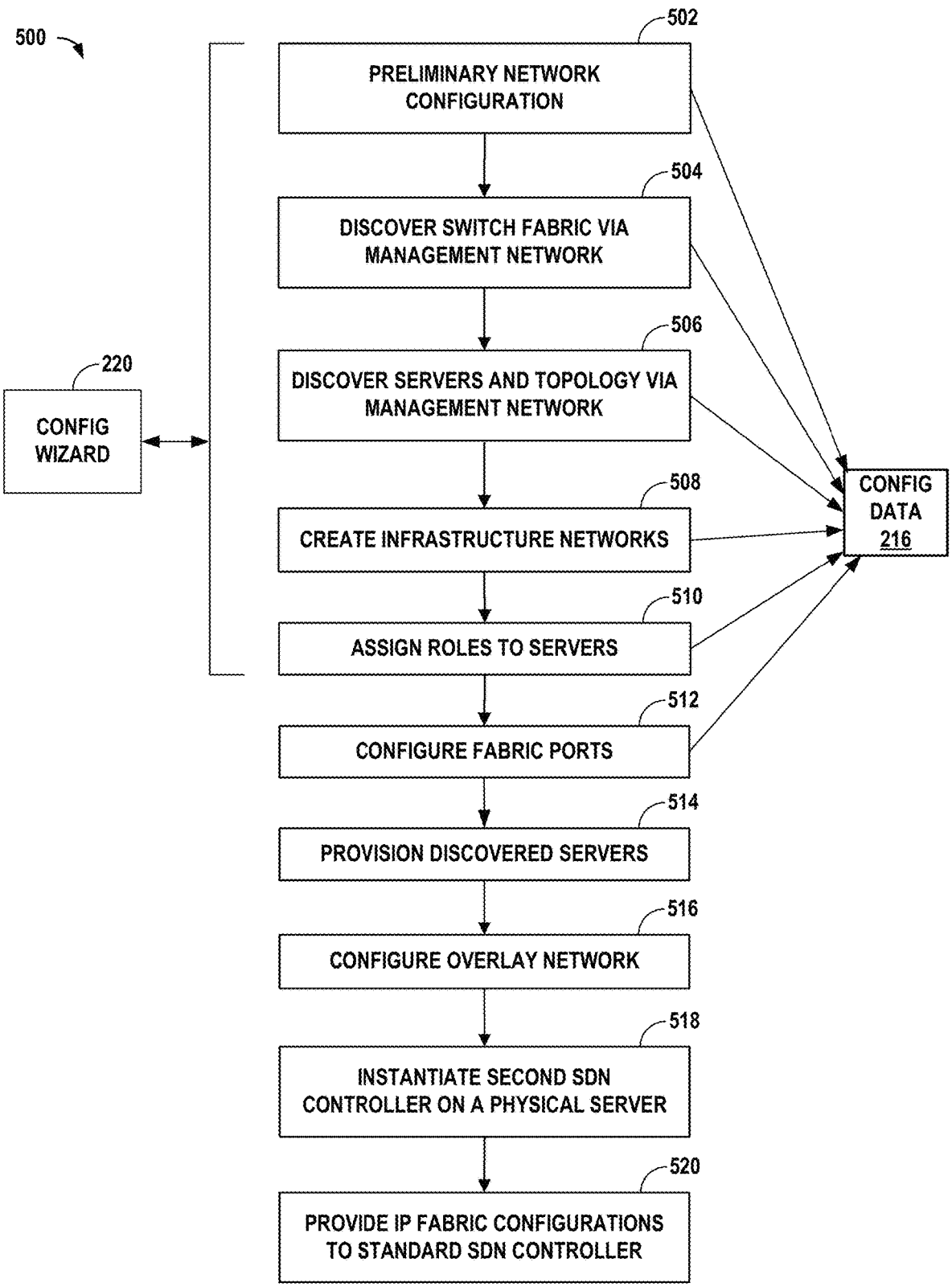
FIG. 5 is a flowchart illustrating a method for performing an end-to-end configuration in accordance with techniques described herein.

FIG. 5 is a flowchart illustrating operations of a method for configuring network devices in a data center in accordance with techniques described herein. In some aspects, the operations can be performed to establish a configuration for a new data center, or to establish a new configuration for a previously configured data center. Preliminary network configuration operations can be performed to establish an initial state of the network configuration (502). In some aspects, a fabric provisioning VLAN, an IPMI VLAN, and a server provisioning VLAN are configured for the management switch 202, fabric management server 140 and provisioning server 210. Additionally, in some aspects, a configuration wizard can present an interface to receive network configuration parameters from a user. The network configuration parameters can be parameters that cannot be otherwise obtained through the discovery process. For example, the user may provide information about VLANs, subnets, loopbacks, Autonomous System Numbers (ASNs) etc. that are to be configured in the data center network. The configuration wizard can store this information as part of the configuration data 216 for the network. At this point, the state of the data center configuration may be similar to that discussed above with respect to FIG. 3A.

The configuration wizard 220 can initiate a switch fabric discovery workflow that can cause a provisional SDN controller to discover switch devices (i.e., data center switches) on an IP fabric via a management network that links the data center switches (e.g., chassis switches 16 and TOR switches 18) to a management switch (504). In some aspects, the provisional SDN controller can discover data center switches by listening for DHCP requests on the out-of-band management network that are issued by the data center switches communicably coupled to the out-of-band management network. For example, a switch may issue a DHCP request when the switch is powered on. Upon receipt of the DHCP request from a data center switch, the provisional SDN controller can utilize information in the request and information in a DHCP database to add switch configuration information about the discovered switch to the configuration data 216. For example, the provisional SDN controller can add data structures such as the example data structures illustrated in FIG. 4A to the configuration data 216. After the switch fabric discovery workflow has been executed, the network configuration state can be similar to the example discussed above with respect to FIG. 3B.

The configuration wizard 220 can initiate a server discovery workflow to discover servers and other network topology information via the management switch (506). The server discovery workflow can cause the provisional SDN controller 142 to receive configuration information from servers that are connected to the OOB management network. The provisional SDN controller can add the server configuration information to the configuration data 216. After the server discovery workflow has been executed, the network configuration state can be similar to the example discussed above with respect to FIG. 3C.

Figure 6:
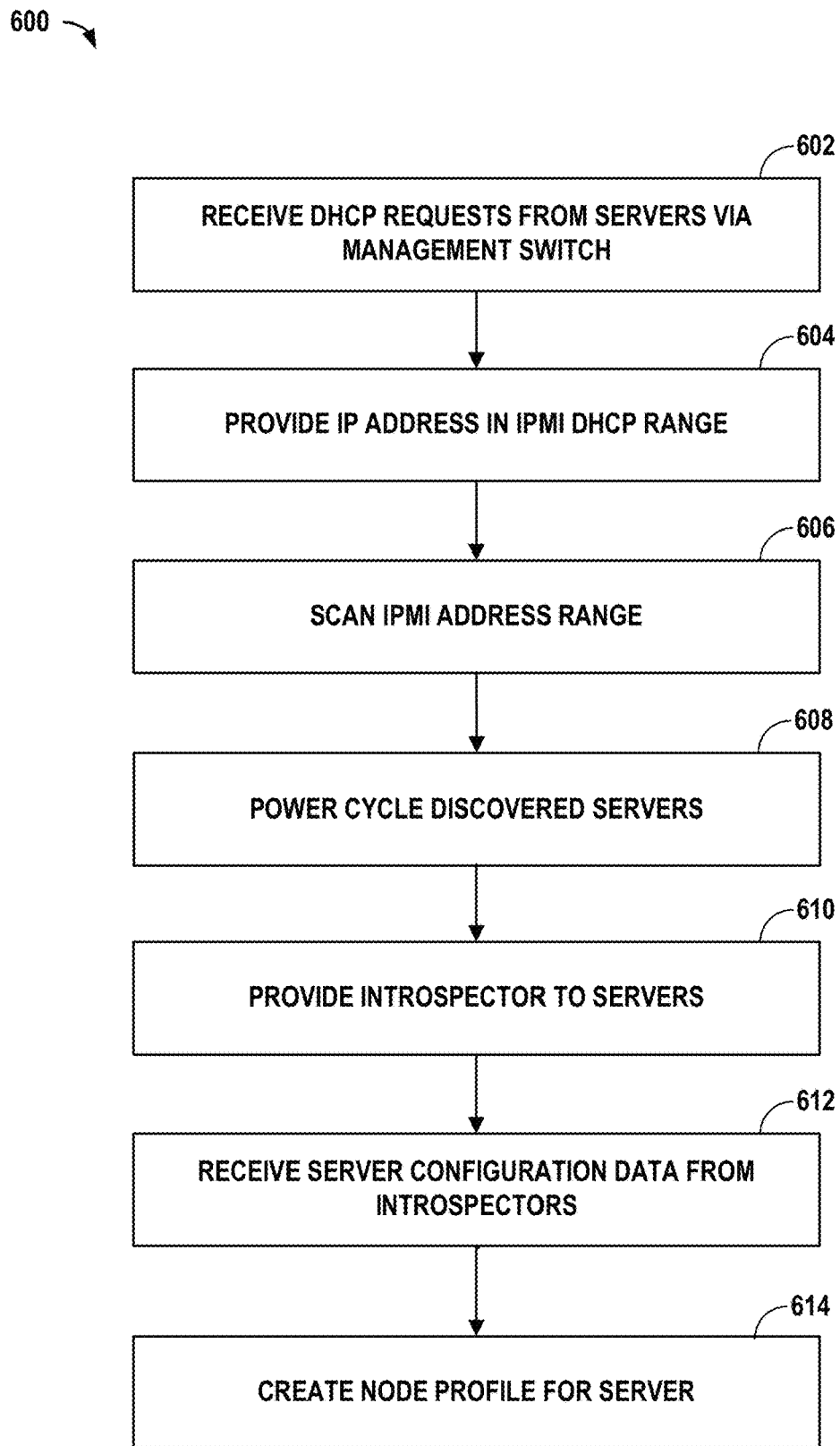
FIG. 6 is a flowchart illustrating a method for discovering and configuring servers in accordance with techniques described herein.

FIG. 6 is a flowchart illustrating example operations of a method for discovering and configuring servers in accordance with techniques described herein. In some aspects, the operations can be performed by a provisional SDN controller 142 (FIG. 2) executing a server discovery workflow. In some aspects, discovering a server can start by the provisional SDN controller 142 (FIG. 2) receiving a DHCP request from a server. For example, an IPMI 212 (FIG. 2) on a server (e.g., server 12A, FIG. 2) can issue a DHCP request when the IPMI 212 is powered on. In response to the DHCP request, the provisional SDN controller can provide an available IP address assignment from within an IPMI DHCP address range (604).

The provisional SDN controller 142 can scan the IPMI address range (606). For example, the provisional SDN controller 142 can ping an IP address in the IPMI address range. If the provisional SDN controller 142 receives a response, the provisional SDN controller can determine if the responding device is a server that has not already been discovered (i.e., an "undiscovered" server). The provisional SDN controller 142 can cause each undiscovered server to be rebooted or power cycled (608). For example, the provisional SDN controller 142 can send a message to an IPMI 212 on an undiscovered server to cause the server to be power cycled.

After being power cycled (or rebooted), the server boots from a Pre-Boot eXecution Environment (PXE) interface. In some aspects, the PXE interface is communicably coupled to provisioning VLAN 306 (FIG. 3). The PXE interface can obtain an introspector 330 (FIG. 3C) from provisioning server 210 that performs an introspection of the server (610). The introspection can include obtaining a list of network interfaces on the server, and a mapping of the server network interfaces to switch ports based on Link Layer Discover Protocol (LLDP) data produced as a result of the introspection. An example of the data returned as a result of the introspection is provided in Table 1 of FIG. 7. In the example illustrated in FIG. 7, the introspector found four network interfaces (en01, en02, ens2f0 and ens2f1), their respective Media Access Control (MAC) addresses, and the corresponding switch and switch ports connected to the respective network interfaces. After the introspector performs the introspection, the introspector can send the resultant server configuration data to the provisional SDN controller 142 (612). As an example, in conjunction with the server discovery process discussed above, the provisional SDN controller 142 can add data structures such as the example data structures 408 and 410, illustrated in FIG. 4B to the configuration data 216. The network configuration state can be similar to the example discussed above with respect to FIG. 3C.

The provisional SDN controller 142 can use the configuration data to create a node profile for the server (614). The node profile can include information such as the vendor name or manufacturer name that manufactures the server, a model name or other identifier for the type of the server, etc. In some aspects, provisional SDN controller 142 can import node profiles based on information discovered about the server and add the appropriate node profile to the configuration data 216. For example, the provisional SDN controller 142 can create data structures 412, 414 and 416 (FIG. 4).

After the server configuration information has been added to the configuration data 216, the provisional SDN controller can determine an IP fabric configuration as further described below.

Returning to FIG. 5, the provisional SDN controller 142 creates infrastructure networks (508). In some aspects, the provisional SDN controller 142 can use parameters obtained during the preliminary configuration operation (502) described above to create the infrastructure networks. As an example, the preliminary configuration operation can specify parameters for a tenant network and a provisioning network. The provisional SDN controller 142 can utilize these parameters to create the tenant network and provisioning network as infrastructure networks.

One or more roles can be assigned to the discovered servers that can describe the functionality provided by the software executing on the server and can be used to determine configuration parameters for the server (510). A server can have more than one role at any given time. In some aspects, a server can be assigned a "controller" role. In addition to the generic controller role, more specific controller roles can be assigned. Examples of such roles include "Contrail Controller," "Kubernetes Master," "OpenStack Controller," and "vCenter." In some aspects, a server can be assigned a "compute" role. In addition to the generic compute role, more specific roles can be assigned. Examples of such roles include "Contrail vRouter," "Kubernetes Node," "Nova Compute," and "ESXi."

In some aspects, the provisional SDN controller 142 can read a data structure that defines mappings between roles, servers, network interface cards, switches and ports. The provisional SDN controller can use the mappings to assign roles to the discovered servers. Example formats for the data structure include a comma separated variables (CSV) or YAML Ain't Markup Language (YAML). In some aspects, a user can assign roles to the discovered servers via a user interface such as a user interface provided by the configuration wizard 220.

The provisional SDN controller 142 can configure fabric ports based on the information discovered about the IP fabric, the attached servers, and the roles assigned to the servers (512). As noted above, a role can be mapped to a network, VLAN and server network interface. The provisional SDN controller 142 can use this mapping along with the introspection data obtained from a server to determine switch port configuration information that can be used to configure the switch ports coupled to the server network interfaces. For example, the provisional SDN controller 142 can configure the VLANs and link aggregations for the switch ports based on the server's role and attached interfaces. An example of the mapping data that can be used is provided in FIG. 8. An administrator may determine the appropriate mapping data based on how the network devices are wired or otherwise coupled and the services to be provided within the SDN. The mapping data may be stored in a configuration file or database for use by the provisional SDN controller 142.

FIG. 8 illustrates an example mapping data structure that defines various mappings between server roles, network interfaces, switch ports, and networks. A user can define labels for various VLANs that may be used in the data center 10A. For example, VLAN labels such as provisioning, tenant, storage, storage management, control, data, internal api, external api etc. may be created that reflect an intended use for the VLANs. These VLAN labels can be mapped to generic network interface identifiers (e.g., nic1, nic2 nic3 etc.). The mappings can then be used when a server is discovered to map the discovered servers actual network interfaces to VLANs and switchports in accordance with the mappings provided in the mapping data structure. In some aspects, the provisional SDN controller 142 can utilize a device manager (not shown) to create the VLANs and map IP Fabric switch ports using the mapping data structure. In some cases, a user may configure a DHCP relay for some of the networks.

To further illustrate the above-described port configuration operations, assume that a discovered server has the network interface configuration shown in FIG. 7. Further, assume that the mapping data of FIG. 8 has been provided to the provisional SDN controller 142. Also, assume that the server has been assigned a "compute" role. The provisional SDN controller 142 determines that the first network interface of the server is "en0l," and that en0l is connected to switch port 561. From entry 802 of the mapping data of FIG. 8, the provisional SDN controller 142 can determine that the first network interface of a server having a compute role (e.g., "nic1") is to be mapped to provisioning, internalapi, externalapi, and tenant VLANs. The provisional SDN controller 142 can use this mapping to configure the attached switch port 561 appropriately. Continuing with the example, nic3 and nic4 are mapped to ens2f0 and ens2f1, and the appropriate switch and switch ports coupled to the interfaces can be appropriately configured. FIG. 9 illustrates an example fabric port configuration based on the above-described example.

After the fabric ports have been configured, the network configuration state can be similar to the example discussed above with respect to FIG. 3D. Based on the example described above, the configuration data 216 with respect to the server can be similar to that illustrated in FIG. 4D.

As will be appreciated from the above, the provisional SDN controller 142 can perform various workflows to automatically discover network devices in a data center such as switches and servers in a data center network and can utilize the discovered information from the various workflows to automatically configure the discovered network devices.

After the discovery and configuration workflows have been completed, the provisional SDN controller 142 can cause the discovered servers to be provisioned (514). For example, the discovered servers can obtain software from provisioning server 210 (FIG. 2). In some aspects, software provisioned on a server can be based on the role assigned to the servers. In some aspects, the provisional SDN controller 142 can cause an Ansible script to be executed that causes the OSP 222 (FIG. 2) to provision the operating system and software for the server based on the role assigned to the server. The provisional SDN controller 142 can determine a server network interface configuration information for a discovered server based on the role of the server and the IP fabric configuration determined as described above. The server network interface configuration information can be used as part of the server provisioning process.

The above-described discovery and configuration workflow operations result in an underlay network being configured for the data center 10A. An underlay network comprises the physical infrastructure (physical switches, servers etc.) on which an overlay network is built. An overlay network is thus a virtual network that can be built on top of and is supported by the underlay network's physical infrastructure. The provisional SDN controller 142 can configure an overlay network using the switches and servers discovered and configured as described above (516). In some aspects, an OpenStack Platform Director (OSPD) of OSP 222 can be used to deploy an overlay network. OSPD can perform various functions as part of the deployment. For example, OSPD can image servers as necessary, configure the overlay network, create role and service configurations, deploy containers, and ensure that instances of services and configurations are aligned and consistent. Additionally, OSPD can deploy a performance monitoring system such as a system that provides monitoring, scheduling, and performance management capabilities for the SDN and devices supporting the SDN.

The configuration wizard 220 can be used to designate a server having a control role to host a standard SDN controller 132 (FIG. 1). The provisional SDN controller 142 instantiates the SDN controller 132 on the designated server (518). In the example illustrated in FIG. 3D, server 12B has been assigned a controller role, and the user has designated the server 12B to host the SDN controller 132. The provisional SDN controller 142 can migrate the configuration data 216 to the SDN controller 132 (520). As part of the migration, in some aspects, the provisional SDN controller 142 extends the provisioning VLAN 302 and IPMI VLAN 304 to the IP fabric 20 and control of the VLANs is migrated to SDN controller 132. In some aspects, discovery and provisioning of devices on the IP fabric can be controlled by SDN controller 132 (in conjunction with other SDN controllers that may be configured for the IP fabric 20). In these aspects, the provisional SDN controller 142 can be disabled or removed. In some examples, the provisional SDN controller 142 can be automatically removed as part of an installation process for the SDN controller 132 after the configuration data 216 has been migrated to a server hosting the SDN controller 132. In other examples, the provisional SDN controller can cause its own removal, the SDN controller 132 can remove the provisional SDN controller 142, or the configuration wizard can remove the provisional SDN controller 142.

In alternative aspects, the provisional SDN control 142 can operate in a federated mode with SDN controller 132. As an example, the provisional SDN controller 142 can provide discovery, configuration and other services for the underlay network while the SDN controller 132 provides services for the overlay network.

In further alternative aspects, the provisional SDN controller 142 is not removed. In such aspects, the provisional SDN controller 142 can be reconfigured as a standard (i.e., full functionality) SDN controller 132. This has the advantage that migration of the configuration data is not necessary.

In some examples, after the above-described switch and server configurations have been determined, a cluster configuration wizard can be utilized to configure groups of two or more servers into clusters. The cluster configuration wizard can be included as part of configuration wizard 220 describe above, or it can be a standalone wizard. The cluster wizard can include a user interface and a backend application that let users create multiple clusters of a data center 10A through a set of forms. The backend application can be part of the provisional SDN controller 142, the SDN controller 142, or it can be a standalone application or part of another application available within the network. The user interface can gather network information (e.g., network devices and applications) from the user about a given cluster, and the backend application can connect network entities from different servers to create the cluster in accordance with the information provided by the user and information obtained as described above with respect to FIGS. 1-9. The user may go through the same steps for each cluster in their data center. The user interface can then provide a view of the entire data center 10A or multiple data centers 10 in one application. In some aspects, the cluster wizard can be used to import a cluster defined by one application, e.g., an RHOSP cluster, into a proprietary cluster application, e.g., a Contrail application. The Contrail application is available from Juniper Networks, Inc. of Sunnyvale, Calif. The cluster wizard can make cluster configuration easier for a user by utilizing information that can be automatically obtained, thereby requiring relatively few steps for the user to perform.

In some aspects, the cluster wizard can receive an inventory of all servers available for assignment to a cluster or can add a new cluster by specifying port groups, etc. The inventory may include servers and switches that are discovered as described above with respect to FIGS. 1-9. The cluster wizard can allow the user to choose to build a propriety cluster or import a previously designed RHOSP cluster into a proprietary cluster. If the user chooses to create an RHOSP cluster, then the user can specify some or all of the following information for the RHOSP cluster:

Infrastructure Networks
Overcloud
Undercloud Nodes
Jumphost Nodes

Figure 10A:
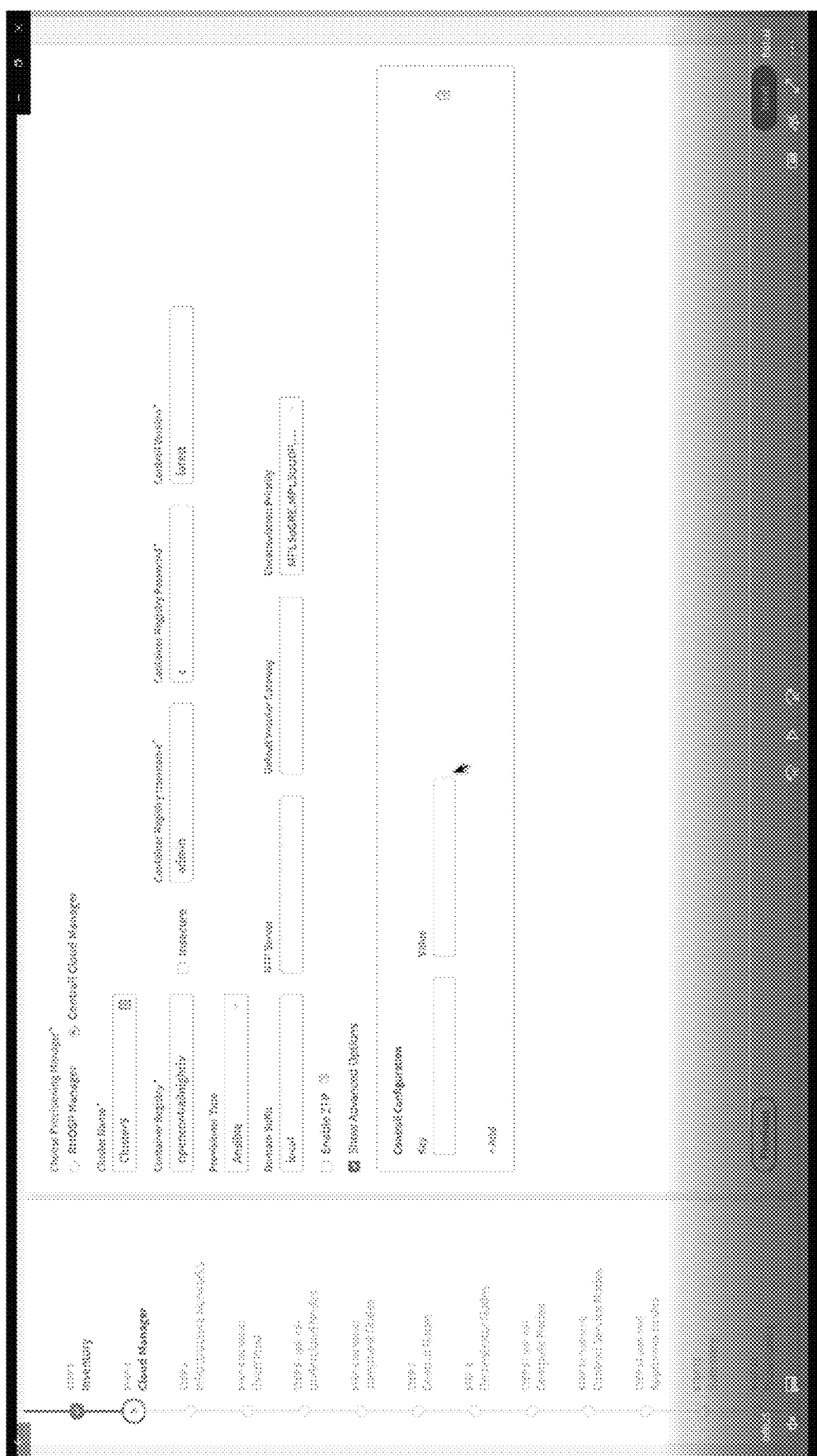
FIGS. 10A-10M illustrate example user interface screens for a cluster configuration wizard according to techniques described herein.

If the user chooses to create a proprietary cluster or import a RHOSP cluster into an existing proprietary cluster, the user can perform some or all of the following via the cluster configuration wizard:

Assign control nodes from available servers
Assign orchestrator nodes from available servers
Assign compute nodes from available servers
Assign service nodes from available servers
Assign Appformix nodes from available servers
Request a cluster overview summary and nodes overview
Provisioning FIGS. 10A-10M illustrate example user interface screens for a cluster configuration wizard according to techniques described herein. FIG. 10A illustrates an example user interface screen to create a cluster using a proprietary cluster application (e.g., a Contrail application). The user interface screen includes various input fields to specify cluster parameters such as a cluster name, a container registry for the cluster, a username and password for the container registry etc.

Figure 10B:
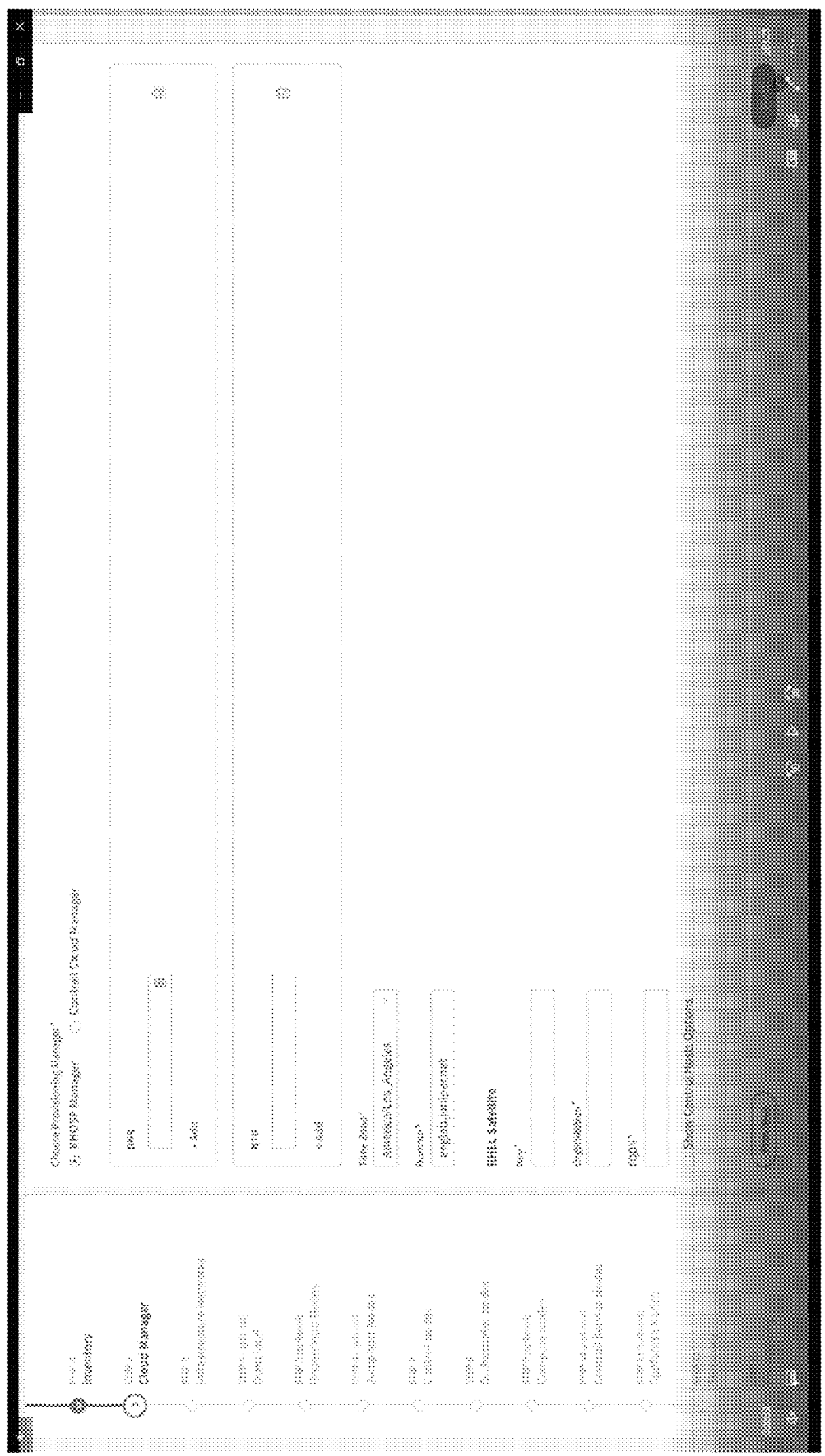

FIG. 10B illustrates an example user interface screen to create an RHOSP cluster. The user interface screen includes various input fields to specify RHOSP cluster parameters such as a Domain Name Service (DNS) and Network Time Protocol (NTP) server, time zone information for the cluster, a domain name for the cluster, etc.

Figure 10C:
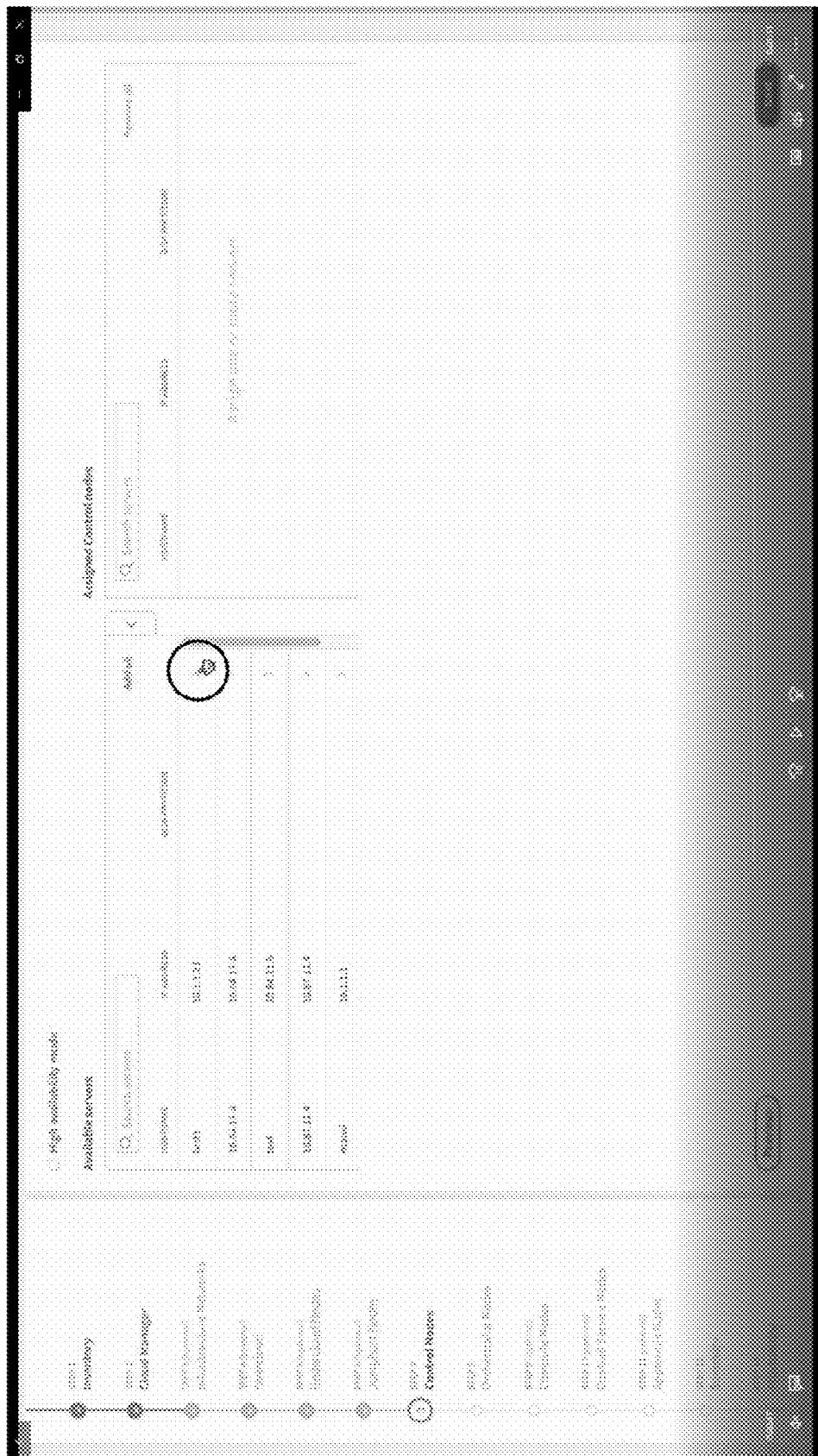

FIG. 10C illustrates an example user interface screen to add control nodes to a cluster. The user interface screen includes a list of available servers. The available servers can be determined as described above with respect to FIGS. 1-9. A user can select a server from the list of servers, and can assign control node roles to the selected server. In the example illustrated in FIG. 10C, the user has selected the server identified as "test1."

Figure 10D:
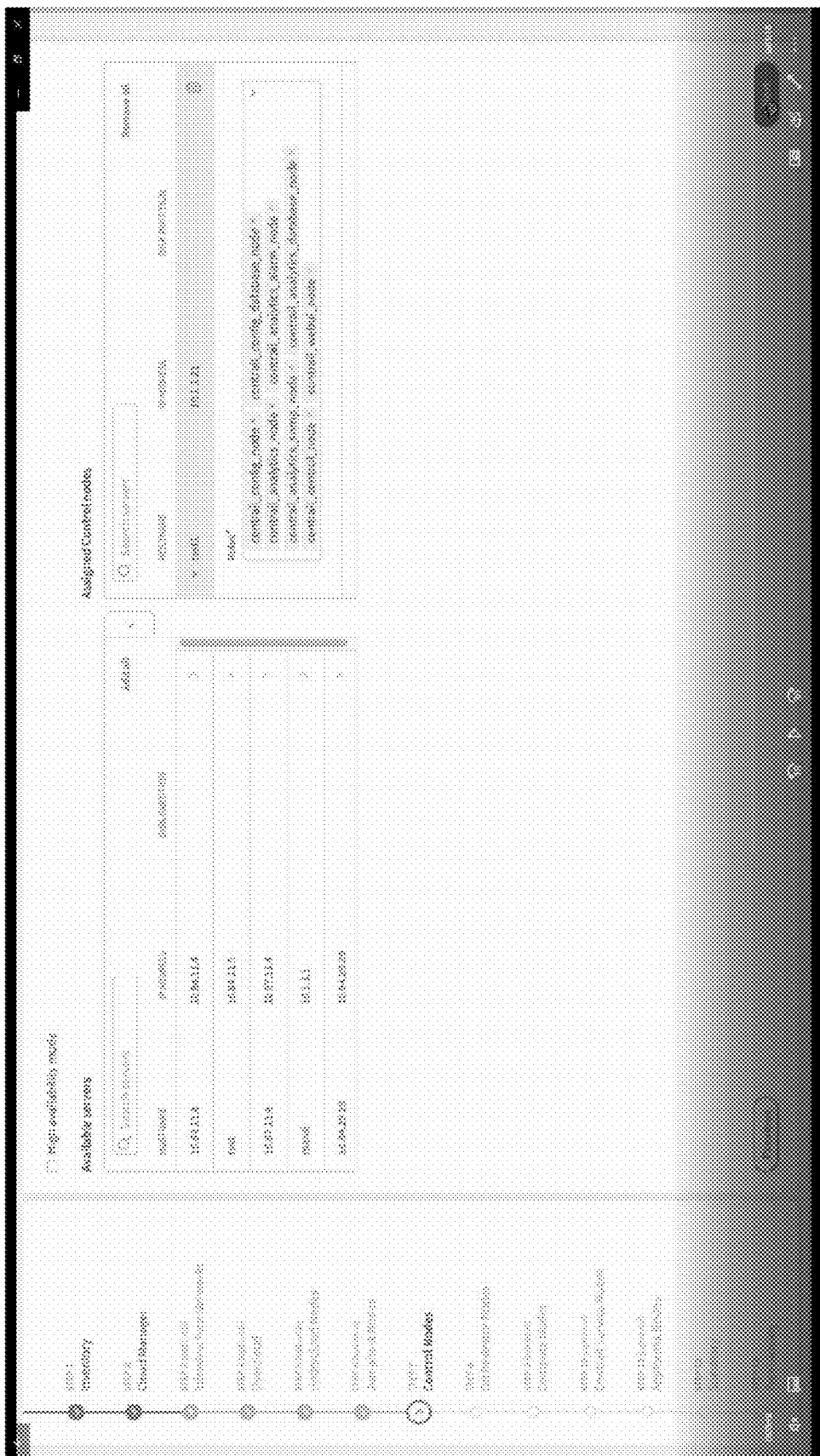

FIG. 10D illustrates an example user interface screen to assign control roles to a selected server. In some aspects, the user can be presented with a list of available control roles, for example, upon moving a selection cursor into the "Roles" field and performing a selection operation such as a mouse click. The user can select one or more control roles from the list of available control roles to assign to the selected server (in this example, "test1").

Figure 10E:
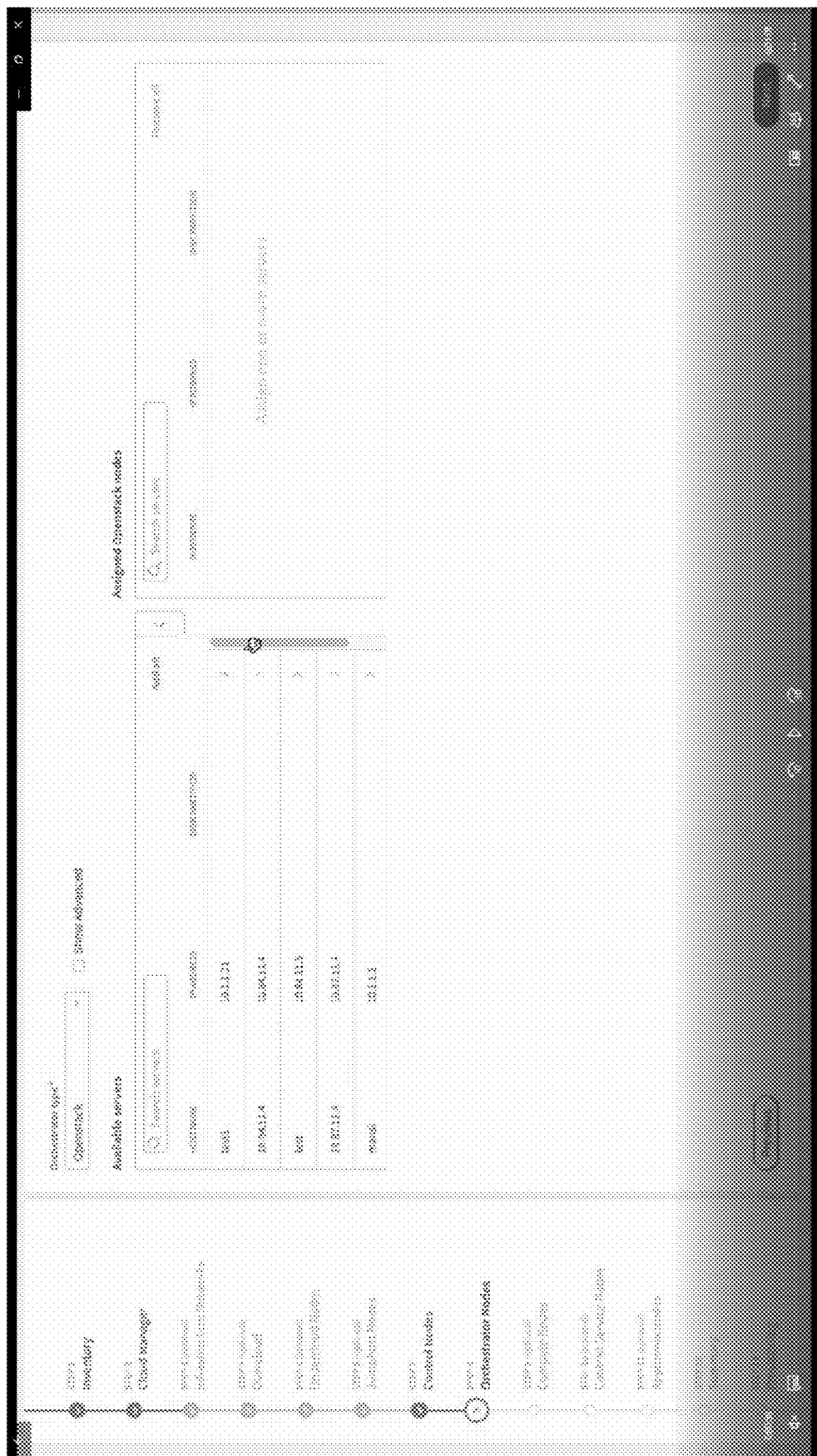

FIG. 10E illustrates an example user interface screen to select orchestrator nodes in a cluster. The user interface screen includes a list of available servers. The available servers can be determined as described above with respect to FIGS. 1-9. A user can select a server from the list of servers, and can assign orchestrator roles to the selected server.

Figure 10F:
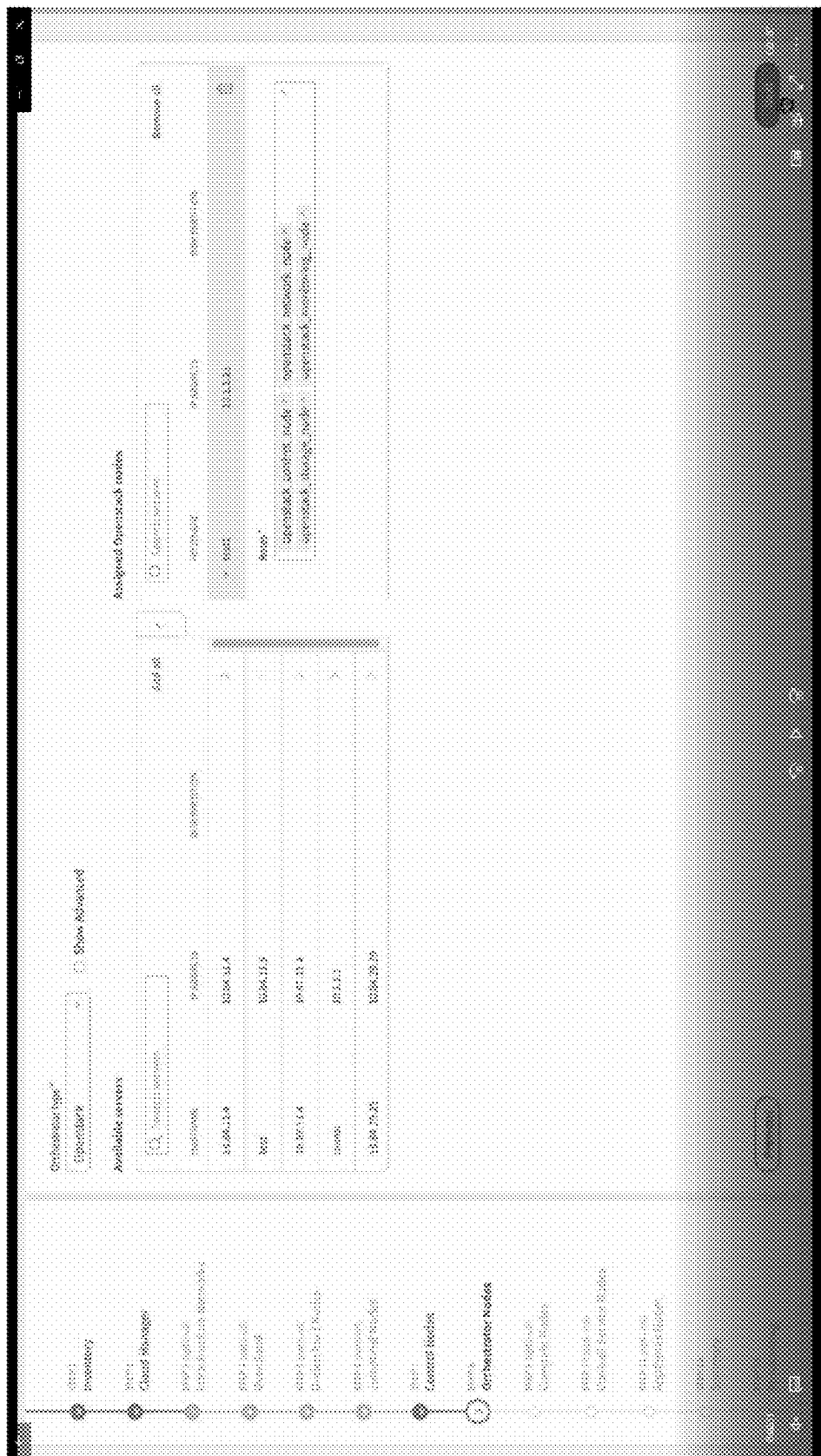

FIG. 10F illustrates an example user interface screen to assign orchestrator roles to a selected server. In some aspects, the user can be presented with a list of available orchestrator roles, for example, upon moving a selection cursor into the "Roles" field and performing a selection operation such as a mouse click. The user can select one or more orchestrator roles from the list of available orchestrator roles to assign to the selected server (in this example, "test1").

Figure 10G:
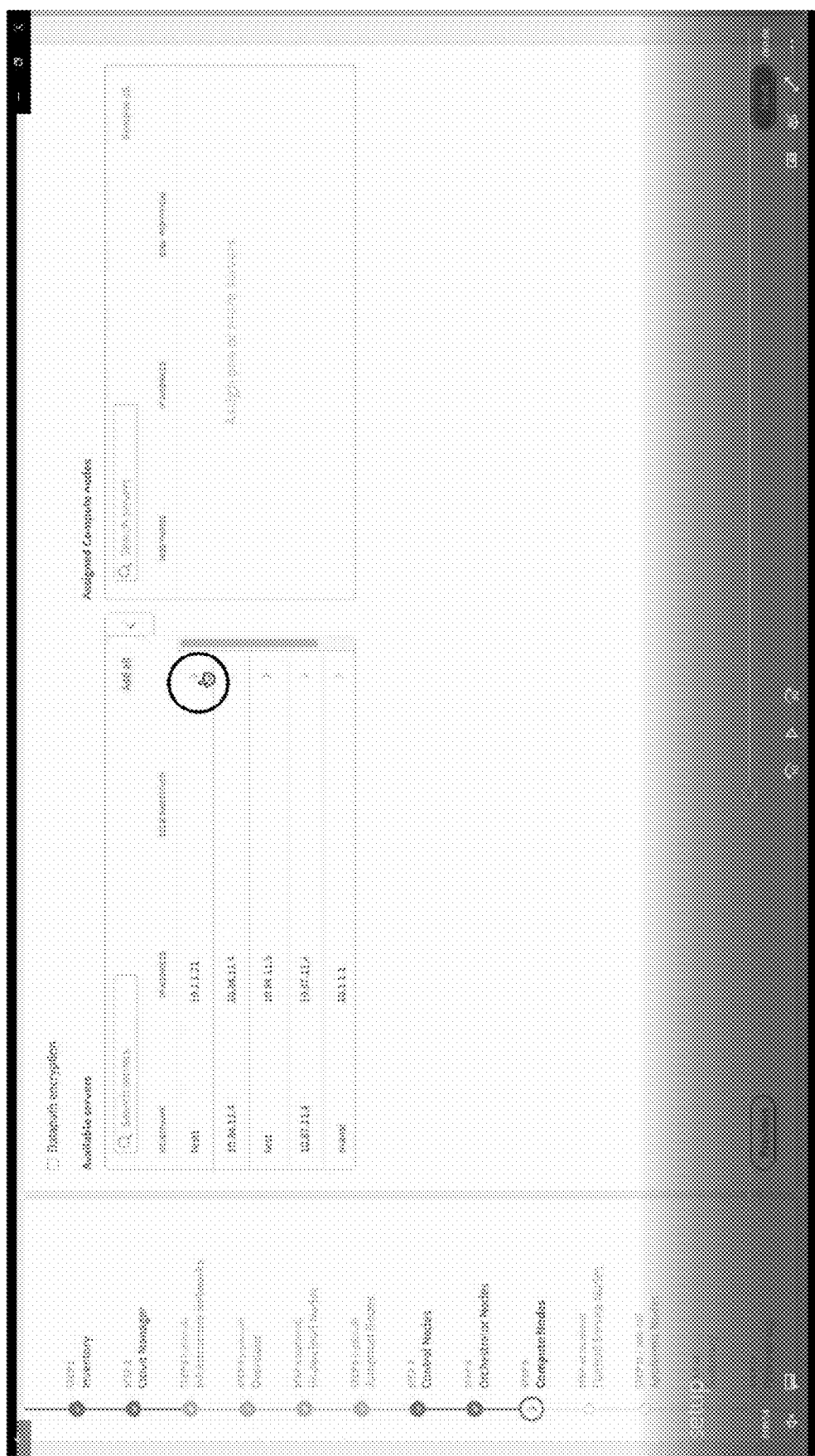

FIG. 10G illustrates an example user interface screen to select compute nodes in a cluster. The user interface screen includes a list of available servers. The available servers can be determined as described above with respect to FIGS. 1-9. A user can select a server from the list of servers, and can assign compute roles to the selected server. In this example, the user has selected the server "test1" to serve as a compute node.

Figure 10H:

FIG. 10H illustrates an example user interface screen to specify compute parameters to a selected server. In some aspects, the user can specify a default virtual router gateway and a type for the selected server (in this example, "test1").

Figure 10I:
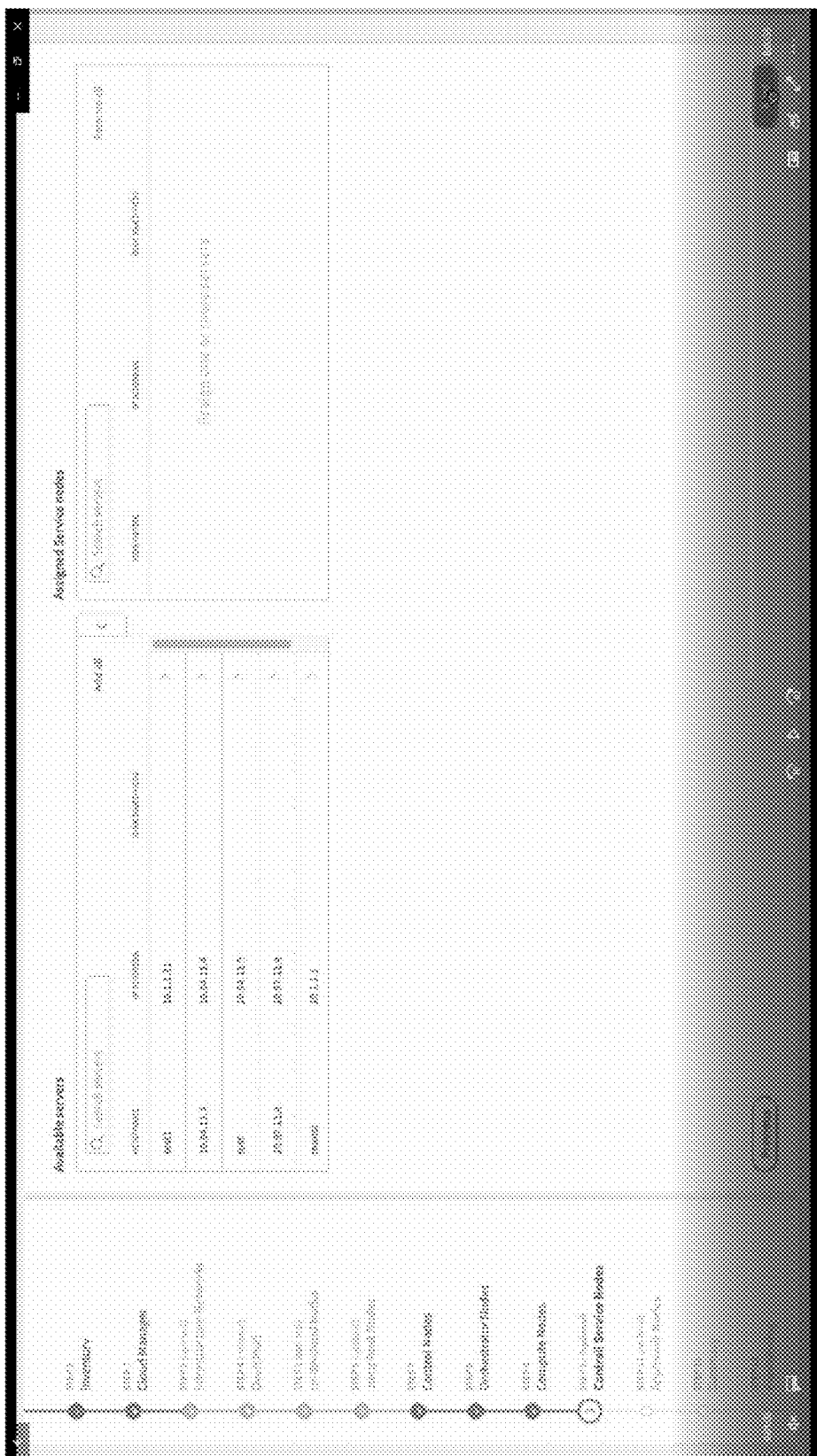

FIG. 10I illustrates an example user interface screen to select service nodes in a cluster. The user interface screen includes a list of available servers. The available servers can be determined as described above with respect to FIGS. 1-9. A user can select a server from the list of servers, and can specify service parameters for the selected server.

Figure 10J:
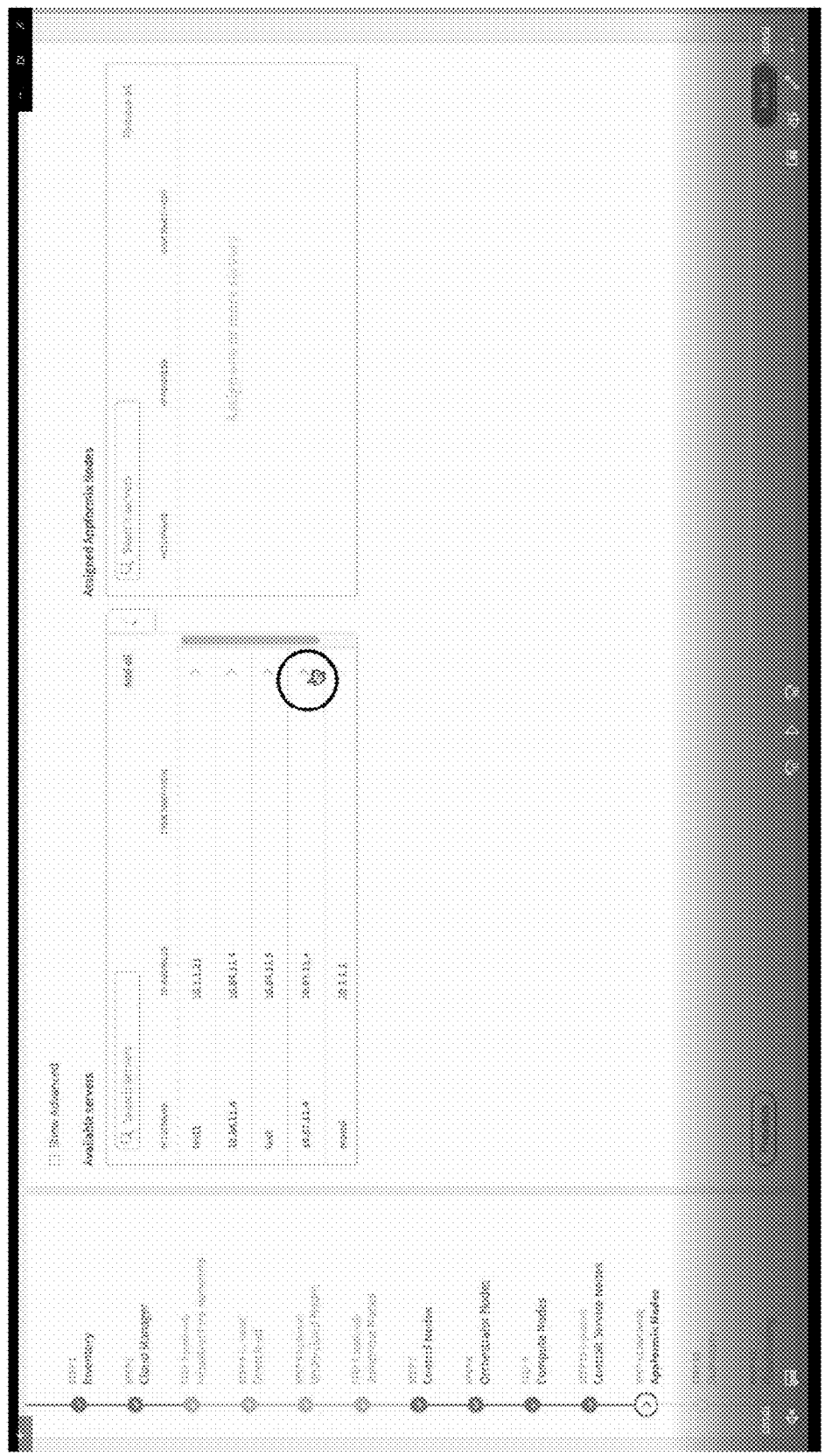

FIG. 10J illustrates an example user interface screen to select performance monitoring nodes in a cluster. In the example illustrated in FIG. 10J, the performance monitoring system is the Appformix system. The user interface screen includes a list of available servers. The available servers can be determined as described above with respect to FIGS. 1-9. A user can select a server from the list of servers, and can assign performance monitoring roles to the selected server. In this example, the user has selected the server with the IP address "10.87.11.4" to serve as a performance monitoring node.

Figure 10K:
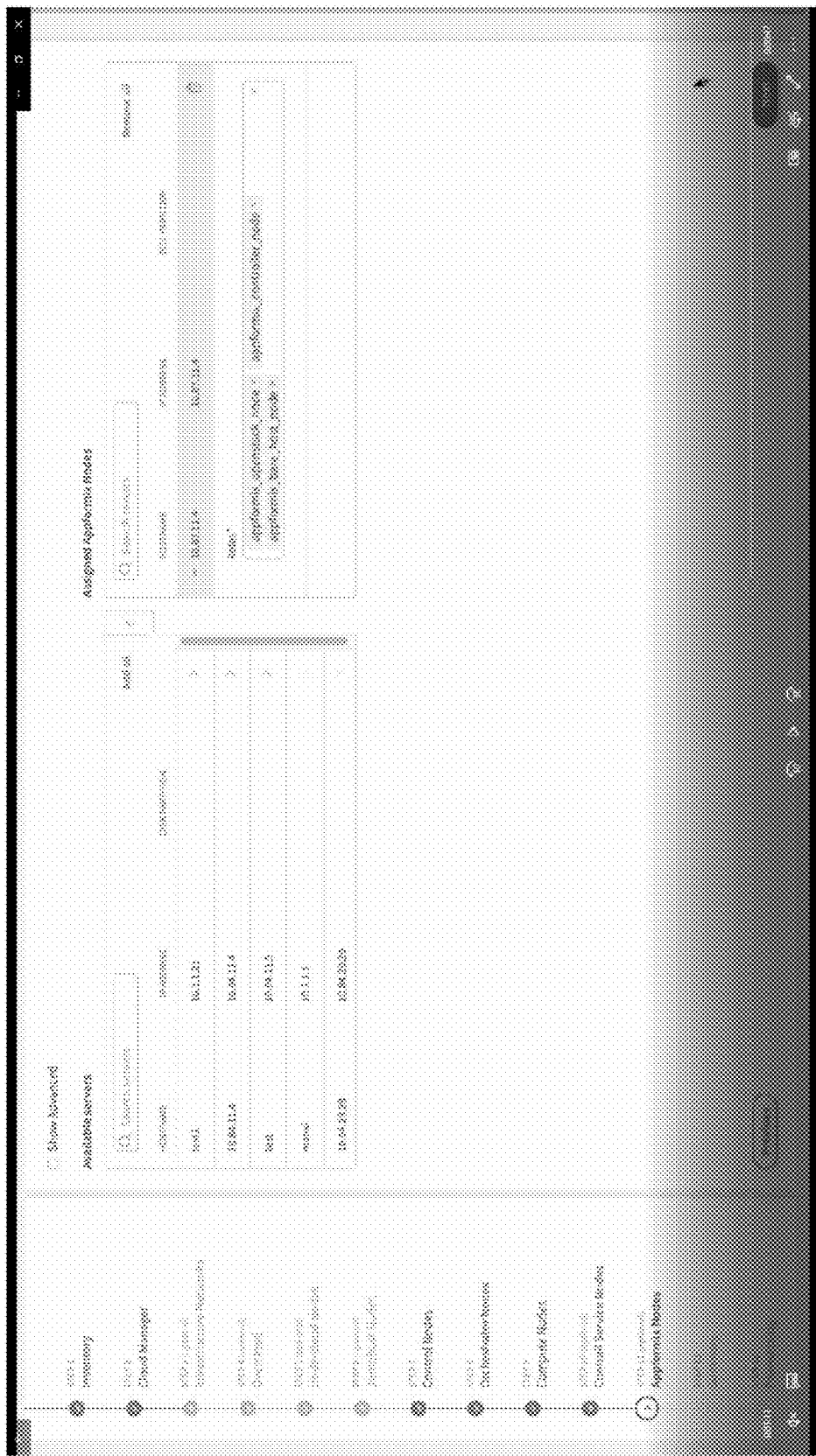

FIG. 10K illustrates an example user interface screen to assign performance monitoring roles to a selected server. In some aspects, the user can be presented with a list of available performance monitoring roles, for example, upon moving a selection cursor into the "Roles" field and performing a selection operation such as a mouse click. The user can select one or more performance monitoring roles from the list of available performance monitoring roles to assign to the selected server (in this example, "10.87.11.4").

Figure 10L:
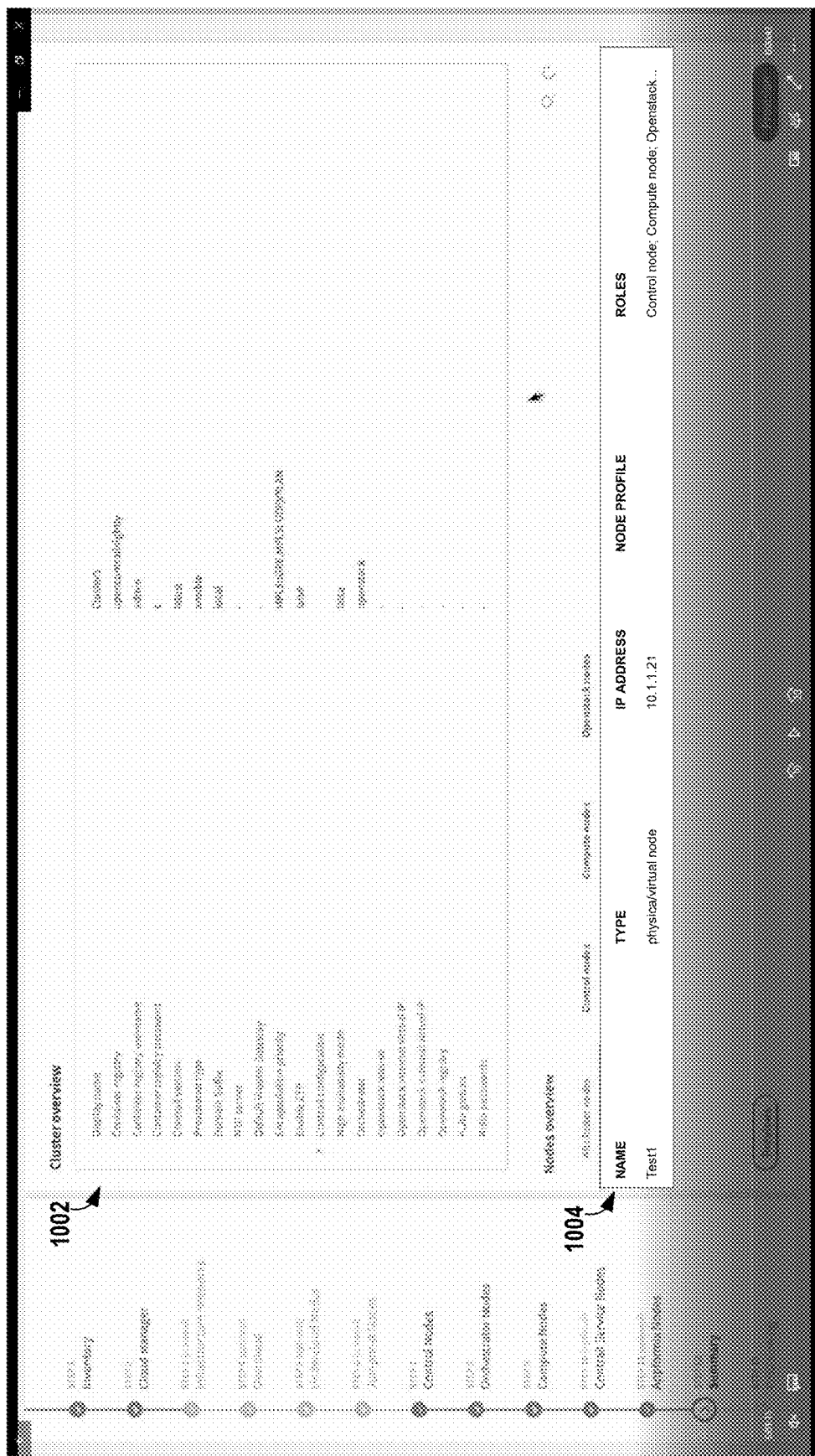

FIG. 10L illustrates an example user interface screen to display a cluster overview (also referred to as a cluster summary). The cluster overview can include various configuration details regarding the selected cluster. The example user interface screen can show parameters that apply to the cluster as a whole (screen region 1002) or parameters that apply to specific selected nodes (screen region 1004).

Figure 10M:
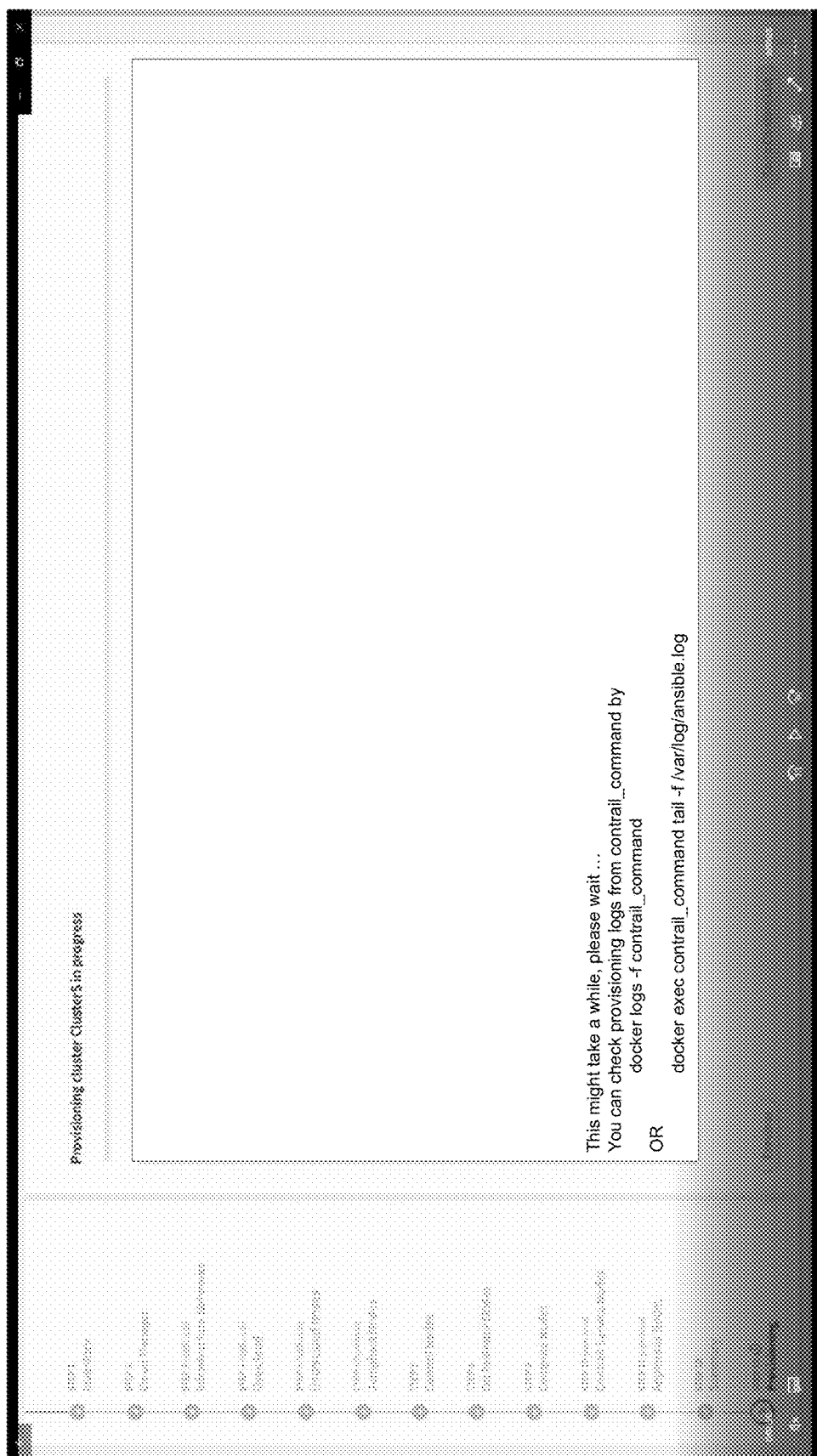

FIG. 10M illustrates an example user interface screen to provision a cluster based on the cluster parameters selected using the cluster configuration wizard.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
receiving, by a Software Defined Networking (SDN) controller, switch configuration information for one or more Internet Protocol (IP) fabric switches communicably coupled to a management switch;
discovering, by the SDN controller, a physical server communicably coupled to the management switch;
receiving, by the SDN controller from the physical server, server configuration information associated with one or more network interfaces coupling the physical server to an IP fabric switch of the one or more IP fabric switches;
determining, by the SDN controller, based at least in part on the server configuration information and the switch configuration information, an IP fabric configuration;
providing, by the SDN controller, switch port configuration information to the one or more IP fabric switches, wherein the switch port configuration information is based, at least in part, on the IP fabric configuration and configuration data indicating a user-assigned role for the physical server; and
providing, by the SDN controller, server network interface configuration information to the physical server, wherein the server network interface configuration information is based, at least in part, on the IP fabric configuration and wherein the server network interface configuration information includes user-specified mapping data that maps one or more network interfaces of the physical server to one or more Virtual Local Area Networks (VLANs).

2. The method of claim 1, wherein the SDN controller comprises a first SDN controller, and wherein the method further comprises:
in response to determining that the user-assigned role for the physical server comprises a controller node, instantiating, by the first SDN controller, a second SDN controller on a second physical server; and
providing, by the first SDN controller, the IP fabric configuration to the second SDN controller, wherein the second SDN controller performs configuration functions of the first SDN controller.

3. The method of claim 2, and further comprising:
after providing the IP fabric configuration to the second SDN controller, disabling the first SDN controller.

4. The method of claim 2, further comprising:
operating, by the first SDN controller, in a federated mode with the second SDN controller after the providing the IP fabric configuration information to the second SDN controller, wherein the first SDN controller manages an underlay network defined by the IP fabric configuration and the second SDN controller manages an overlay network configured to utilize services provided by the underlay network.

5. The method of claim 1, further comprising:
in response to discovering the physical server, rebooting the physical server, wherein receiving the server configuration information associated with the one or more network interfaces of the physical server comprises receiving the server configuration information after the physical server is rebooted.

6. The method of claim 5, wherein the method further comprises:
in response to rebooting the physical server, loading, by the physical server, an introspector program configured to determine the server configuration information, wherein receiving the server configuration information comprises receiving the server configuration information from the introspector program.

7. The method of claim 1, further comprising determining, by the SDN controller, the server network interface configuration information based, at least in part, on the user-assigned role associated with the physical server.

8. The method of claim 7, further comprising:
determining, based on the role associated with the physical server, a first mapping from one or more VLANs to one or more generic network interfaces.

9. The method of claim 8, further comprising determining a second mapping from the one or more generic network interfaces to one or more network interfaces of the physical server.

10. A system comprising:
a Software Defined Network (SDN) controller;
a physical server;
a management switch communicably coupled to the SDN controller and the physical server; and
one or more Internet Protocol (IP) fabric switches communicably coupled to the physical server;
wherein the SDN controller is configured to:
receive switch configuration information for the one or more IP fabric switches communicably coupled via the management switch,
discover the physical server communicably coupled to the management switch, receive, from the physical server via the management switch, server configuration information associated with one or more network interfaces coupling the physical server to an IP fabric switch of the one or more IP fabric switches, determine, based at least in part on the server configuration information and the switch configuration information, an IP fabric configuration, provide switch port configuration information to the one or more switches, wherein the switch port configuration information is based, at least in part, on the IP fabric configuration and configuration data indicating a user-assigned role for the physical server, and provide server network interface configuration information to the physical server, wherein the server network interface configuration information is based, at least in part, on the IP fabric configuration and wherein the server network interface configuration information includes user-specified mapping data that maps one or more network interfaces of the physical server to one or more Virtual Local Area Networks (VLANs).

11. The system of claim 10, wherein the SDN controller comprises a first SDN controller, wherein the first SDN controller is configured to:

in response to a determination that the user-assigned role for the physical server comprises a controller node, instantiate a second SDN controller on a second physical server; and provide the IP fabric configuration to the second SDN controller, wherein the second SDN controller performs configuration functions of the first SDN controller.

12. The system of claim 11, wherein the first SDN controller is further configured to:

after providing the IP fabric configuration to the second SDN controller, disable the first SDN controller.

13. The system of claim 11, wherein the first SDN controller and the second SDN controller are configured to operate in a federated mode after instantiation of the second SDN controller, and wherein the first SDN controller manages an underlay network defined by the IP fabric configuration and the second SDN controller manages an overlay network configured to utilize services provided by the underlay network.

14. The system of claim 10, wherein the SDN controller is further configured to:

in response to discovery of the physical server, reboot the physical server, wherein the first SDN controller receives the server configuration information associated with the one or more network interfaces of the physical server after the physical server is rebooted.

15. The system of claim 14, wherein in response to reboot of the physical server, the physical server loads an introspector program configured to determine the server configuration information, wherein the first SDN controller receives the server configuration information from the introspector program.

16. The system of claim 10, wherein the SDN controller is further configured to determine the server network interface configuration information based, at least in part, on the user-assigned role associated with the physical server.

17. The system of claim 16, wherein the SDN controller is further configured to:

to determine, based on the user-assigned role associated with the physical server, a first mapping from one or more VLANs to one or more generic network interfaces.

18. The system of claim 17, wherein the SDN controller is further configured to determine a second mapping from the one or more generic network interfaces to one or more network interfaces provided by the physical server.

19. A non-transitory computer-readable medium comprising instructions for causing a programmable processor executing a Software Defined Networking (SDN) controller to:

receive switch configuration information for one or more Internet Protocol (IP) fabric switches communicably coupled via a management switch;

discover a physical server communicably coupled to the management switch;

receive, from the physical server, server configuration information associated with one or more network interfaces coupling the physical server to an IP fabric switch of the one or more IP fabric switches;

determine, based at least in part on the server configuration information and the switch configuration information, an IP fabric configuration;

provide switch port configuration information to the one or more IP fabric switches, wherein the switch port configuration information is based, at least in part, on the IP fabric configuration and configuration data indicating a user-assigned role assigned for the physical server; and provide server network interface configuration information to the physical server, wherein the server network interface configuration information is based, at least in part, on the IP fabric configuration and wherein the server network interface configuration information includes user-specified mapping data that maps one or more network interfaces of the physical server to one or more Virtual Local Area Networks (VLANs).

20. The computer-readable medium of claim 19, wherein the switch port configuration information for the IP fabric switch of the one or more IP fabric switches is based, at least in part, on the user-assigned role associated with the physical server communicably coupled to the IP fabric switch.

* * * * *